(12) United States Patent
Schjerven, Sr. et al.

(10) Patent No.: US 11,369,117 B2
(45) Date of Patent: Jun. 28, 2022

(54) CONVEYOR OVEN AIR SYSTEM

(71) Applicant: THE MIDDLEBY CORPORATION, Elgin, IL (US)

(72) Inventors: William S. Schjerven, Sr., Schaumburg, IL (US); Richard H. Van Camp, Aurora, IL (US); Theodore James Chmiola, Roscoe, IL (US)

(73) Assignee: THE MIDDLEBY CORPORATION, Elgin, IL (US)

( * ) Notice: Subject to any disclaimer, the term of this patent is extended or adjusted under 35 U.S.C. 154(b) by 162 days.

(21) Appl. No.: 16/714,526

(22) Filed: Dec. 13, 2019

(65) Prior Publication Data
US 2020/0196614 A1 Jun. 25, 2020

Related U.S. Application Data

(60) Provisional application No. 62/783,018, filed on Dec. 20, 2018.

(51) Int. Cl.
*A21B 1/26* (2006.01)
*A21B 1/48* (2006.01)
(Continued)

(52) U.S. Cl.
CPC ............... *A21B 1/26* (2013.01); *A21B 1/48* (2013.01); *F23D 14/10* (2013.01); *F24C 3/087* (2013.01); *F24C 15/322* (2013.01)

(58) Field of Classification Search
CPC .. A21B 1/26; A21B 1/48; A21B 1/245; A21B 1/02; F23D 14/10; F24C 3/087;
(Continued)

(56) References Cited

U.S. PATENT DOCUMENTS 2,668,366 A * 2/1954 Barnett ................ F26B 15/085
34/66
3,375,792 A * 4/1968 Seeder .................... A21B 1/02
432/48

(Continued)

FOREIGN PATENT DOCUMENTS

CN 203102114 U * 7/2013
CN 206410219 U * 8/2017
(Continued)

OTHER PUBLICATIONS

Extended European Search Report for Application No. 19218369.7 dated May 14, 2020 (8 pages).

*Primary Examiner* — Jorge A Pereiro
(74) *Attorney, Agent, or Firm* — Michael Best & Friedrich LLP

(57) ABSTRACT

A conveyor oven for cooking food and having an oven chamber in which food is cooked; a conveyor moveable to convey food within the oven chamber; a burner assembly operable to emit a flame to heat air for cooking food moving within the oven chamber on the conveyor; a burner tube extending into a compartment and positioned to receive at least a portion of the flame emitted by the burner assembly; and one or more passive tubes in the compartment positioned opposite the burner tube, wherein elongated baffles are located between adjacent passive tubes, wherein a baffle plate is located between the burner and passive tubes to restrict airflow from the burner tube to the passive tube, and/or wherein shelf assemblies in the oven enable movement (and in some cases removal) of a shelf with a corresponding fan and/or motor without disturbing other shelves and their corresponding fans and/or motors.

21 Claims, 13 Drawing Sheets

(51) Int. Cl.
*F23D 14/10* (2006.01)
*F24C 3/08* (2006.01)
*F24C 15/32* (2006.01)

(58) Field of Classification Search
CPC ...... F24C 15/322; A47J 37/044; A47J 37/045; F27B 9/243; F26B 15/085; F26B 17/04; H05K 7/20581; H05K 7/20172
See application file for complete search history.

(56) References Cited

U.S. PATENT DOCUMENTS

| | | | | |
|---|---|---|---|---|
| 4,774,631 A * | 9/1988 | Okuyama | .......... | H05K 7/20581 |
| | | | | 361/695 |
| 4,964,392 A * | 10/1990 | Bruno | .......... | A21B 1/48 |
| | | | | 126/21 A |
| 5,223,290 A * | 6/1993 | Alden | .......... | A21B 1/48 |
| | | | | 426/243 |
| 5,277,105 A | 1/1994 | Bruno et al. | | |
| 5,788,467 A * | 8/1998 | Zenitani | .......... | H05K 7/20581 |
| | | | | 361/694 |
| 5,901,641 A | 5/1999 | McNamara | | |
| 5,906,485 A | 5/1999 | Groff et al. | | |
| 6,084,214 A * | 7/2000 | Tallman | .......... | B23K 1/012 |
| | | | | 219/388 |
| 6,115,250 A * | 9/2000 | Schmitt | .......... | H05K 7/20727 |
| | | | | 165/104.34 |
| 6,168,396 B1 * | 1/2001 | Homola | .......... | F04D 29/602 |
| | | | | 417/360 |
| 6,186,889 B1 * | 2/2001 | Byrne | .......... | G06F 1/20 |
| | | | | 361/695 |
| 6,396,031 B1 * | 5/2002 | Forrester | .......... | A47J 37/044 |
| | | | | 219/494 |
| 6,407,918 B1 * | 6/2002 | Edmunds | .......... | H05K 7/20581 |
| | | | | 165/104.34 |
| 6,481,433 B1 | 11/2002 | Schjerven, Sr. et al. | | |
| 6,526,961 B1 * | 3/2003 | Hardenburger | .......... | A21B 1/48 |
| | | | | 126/21 A |
| 6,655,373 B1 * | 12/2003 | Wiker | .......... | F23D 14/84 |
| | | | | 126/21 A |
| 6,714,411 B2 * | 3/2004 | Thompson | .......... | H05K 7/20581 |
| | | | | 165/104.33 |
| 6,839,233 B2 * | 1/2005 | Cravens | .......... | H05K 7/20727 |
| | | | | 361/695 |
| 7,054,155 B1 * | 5/2006 | Mease | .......... | H05K 7/20581 |
| | | | | 165/104.34 |
| 7,624,728 B1 | 12/2009 | Forbes | | |
| 8,087,407 B2 | 1/2012 | Wiker et al. | | |
| 8,281,779 B2 | 10/2012 | Wiker et al. | | |
| 9,585,401 B2 | 3/2017 | Wiker et al. | | |
| 2001/0055740 A1 * | 12/2001 | Bloom | .......... | F27B 9/10 |
| | | | | 432/247 |
| 2002/0094283 A1 * | 7/2002 | Salmen | .......... | F04D 25/0613 |
| | | | | 417/360 |
| 2003/0042244 A1 * | 3/2003 | Zapata | .......... | A21B 1/245 |
| | | | | 219/400 |
| 2004/0063058 A1 * | 4/2004 | Orbeck | .......... | F27D 9/00 |
| | | | | 432/128 |
| 2004/0231301 A1 * | 11/2004 | VanderTuin | .......... | B65B 61/12 |
| | | | | 53/557 |
| 2005/0026100 A1 * | 2/2005 | Hawkins | .......... | F23D 14/74 |
| | | | | 431/195 |
| 2008/0245359 A1 | 10/2008 | Williamson | | |
| 2008/0264407 A1 | 10/2008 | Bramhall | | |
| 2010/0058936 A1 | 3/2010 | Schjerven, Sr. et al. | | |
| 2010/0104997 A1 | 4/2010 | Wolfe et al. | | |
| 2010/0267188 A1 | 10/2010 | Parks et al. | | |
| 2011/0048245 A1 * | 3/2011 | Schjerven, Sr. | .......... | A21B 1/245 |
| | | | | 99/331 |
| 2011/0139142 A1 | 6/2011 | Schalueck | | |
| 2011/0269085 A1 * | 11/2011 | Wiker | .......... | A21B 3/04 |
| | | | | 432/4 |
| 2012/0152499 A1 * | 6/2012 | Seccuro | .......... | F28D 1/0477 |
| | | | | 165/104.34 |
| 2012/0152502 A1 * | 6/2012 | Seccuro | .......... | F25D 17/067 |
| | | | | 165/121 |
| 2012/0294596 A1 | 11/2012 | Agnello et al. | | |
| 2015/0140499 A1 * | 5/2015 | Lewis | .......... | F23D 11/404 |
| | | | | 431/185 |

FOREIGN PATENT DOCUMENTS

| | | | |
|---|---|---|---|
| WO | 2017191551 A1 | 11/2017 | |
| WO | 2018187457 A1 | 10/2018 | |
| WO | 2018187458 A2 | 10/2018 | |
| WO | WO-2018187458 A2 * | 10/2018 | ............... A21B 1/02 |

* cited by examiner

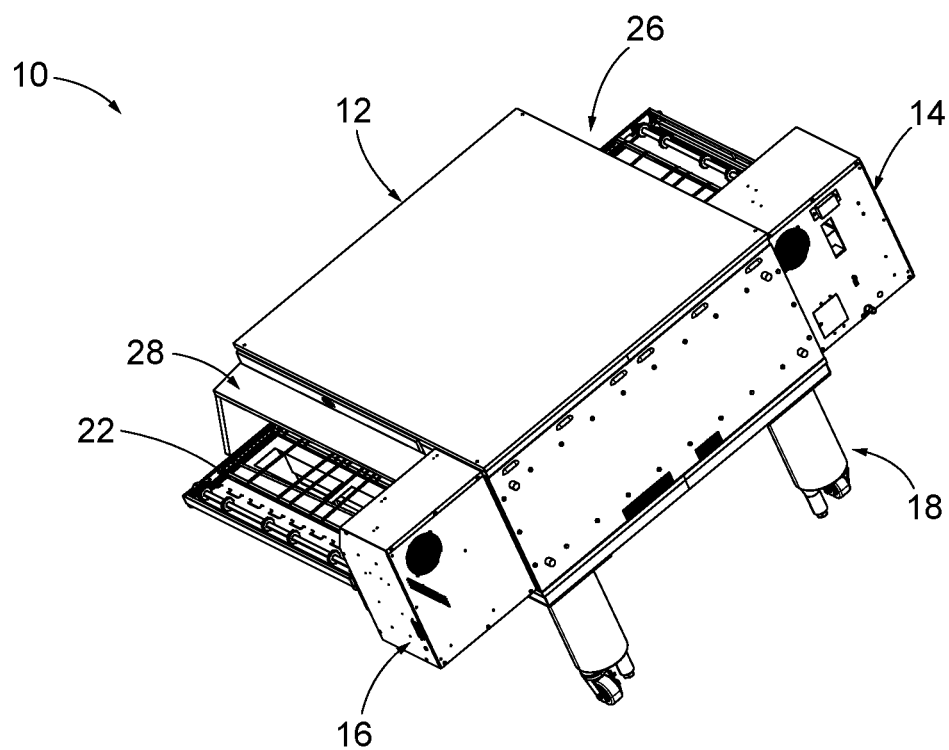
FIG. 3
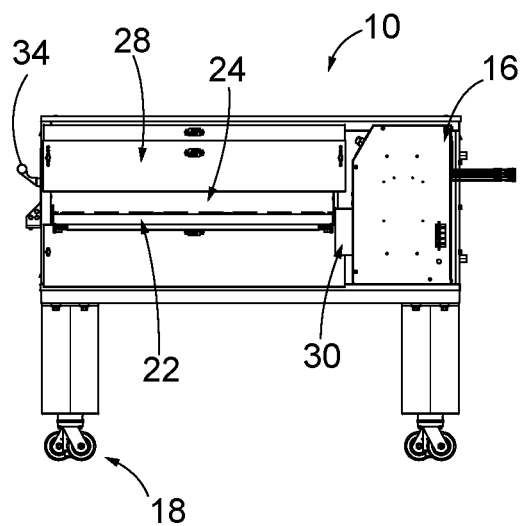 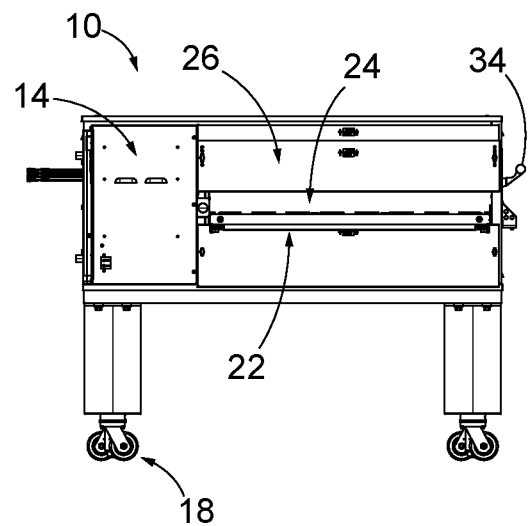
FIG. 4        FIG. 5

CONVEYOR OVEN AIR SYSTEM

CROSS-REFERENCE TO RELATED APPLICATIONS

Priority is hereby claimed to U.S. provisional patent application No. 62/783,018 filed on Dec. 20, 2018, the entire contents of which are incorporated hereby by reference.

BACKGROUND

Conveyor ovens are widely used for cooking pizzas and a wide variety of other food products. Examples of such ovens are shown, for example, in U.S. Pat. Nos. 5,277,105, 6,481,433 and 6,655,373, as well as U.S. Pat. Nos. 8,281,779, 8,087,407, and 9,585,401.

Conveyor ovens are typically large metallic housings with a heated tunnel extending through them and a conveyor running through the tunnel. In many cases, such conveyor ovens are either 70 or 55 inches long, although they may be constructed in any other suitable size. The conveyor transports food products through the heated oven tunnel at a speed which cooks food products during their transit through the tunnel. Conveyor ovens typically include a heat delivery system including one or more blowers which supply heat to the tunnel through passageways leading to metal fingers opening into the oven tunnel. Such metal fingers are often located above and below the conveyor. The metal fingers act as airflow channels that deliver streams of hot air which impinge upon the surfaces of the food products passing through the tunnel on the conveyor. In modern conveyor ovens, a microprocessor-driven control panel generally enables the user to regulate heat delivery (e.g., to control the temperature within the oven, the heat output of the heat delivery system, and the like), the speed of the conveyor, and other oven functions to properly cook food product being transported through the oven.

Conveyor ovens are generally controlled with the intent to achieve repeatable and controllable heating of the oven chamber. The conveyor generally travels at a speed calculated to properly cook food products on the conveyor belt during the time period required for the conveyor to carry the food products through the entire length of the oven tunnel. In some conveyor ovens, other food products requiring less time to cook may be placed on the conveyor at a point partially through the oven chamber so that they travel only a portion of the length of the tunnel. A pizza is an example of a food product which might require the full amount of cooking time in order to be completely cooked in the oven. A sandwich is an example of a product which might require only a portion of the full cooking time. In conventional conveyor ovens, the time required to cook a pizza, for example, from an uncooked state to a fully cooked state is in excess of 4 or 5 minutes, regardless of how much heat and air flow are supplied to the conveyor supporting the pizza.

Conveyor ovens are typically used in restaurant kitchens and commercial food manufacturing facilities. Typically, they are kept running for extended periods of time, including periods when food products are not being cooked. Since the inlet and outlet ends of the oven tunnel are open, this means that heat and noise are continuously escaping from the conveyor oven tunnel into the surrounding environment. This escape of heat wastes energy, and also warms the surrounding environment often to unnecessary and uncomfortable levels. This is particularly the case where the conveyor oven is being used in relatively cramped restaurant kitchen environments. The escaping noise is also undesirable, since it may interfere with interpersonal communication among those working near the oven.

Conventional conveyor ovens also provide users with limited ability to reduce energy losses while running at less than full capacity. In many cases, users only have the ability to turn such ovens on or off, which often involves unacceptably long shut-down and/or start-up times. Therefore, it is often necessary to leave such ovens on (or in a state in which they consume excessive energy) despite the waste of fuel or other energy supplied to the ovens when cooking food intermittently. It is not uncommon for a conventional conveyor oven to be left running in full production mode for substantially the entire period of time a restaurant or other cooking facility is open.

It is generally desirable to maintain controlled heating and temperatures within the tunnel of a conveyor oven during operation. Among the challenges to be overcome in achieving such controlled heating and temperatures are the inherent variations in heating from oven to oven due to variations in the internal physical environment of otherwise identical ovens. A more significant challenge is the constantly changing physical and thermal configuration of the tunnel as food products being cooked pass from one end of the tunnel to the other. For example, raw pizzas entering the inlet to the tunnel constantly change the physical and thermal configuration of the tunnel environment as they advance to the other end, while drawing and emitting ever-varying amounts of heat. As a result, temperatures within the oven can vary greatly from one end of the tunnel to the other.

Currently, the most common technique for controlled heating through the length of the conveyor oven tunnel involves monitoring temperatures near the inlet and outlet ends of the heated tunnel to maintain a predetermined average temperature over the length of the tunnel. Thus, for example, as a cold raw pizza enters the inlet to the tunnel, thereby causing a sudden drop in the tunnel temperature at the inlet, the drop in temperature is sensed, and more heat is supplied to the tunnel to raise the temperature at or near the inlet temperature sensor. Unfortunately, this can also raise the temperature at the outlet of the oven, which causes the temperature sensor at the outlet to trigger a heating reduction to prevent an excessive temperature at or near the tunnel outlet. In this way, temperature sensors near the inlet and outlet of the oven help to achieve controlled heating of the tunnel to generally maintain a target average temperature.

However, controlled and repeatable heating along the length of the heated tunnel (e.g., whether a desired uniform or non-uniform temperature profile along the length of the tunnel) cannot be achieved in this way. Thus, food products traveling through the oven do not experience controlled and repeatable heating which, it has been discovered, makes it necessary to slow the conveyor to a speed which completes the cooking in more time than would be the case if a desired temperature profile could be achieved throughout the length of the heated tunnel. In other words, improved heating control from one end of the tunnel to the other may reduce required cooking times and increase cooking quality.

Additionally, in many applications it is necessary to be able to operate the conveyor oven using either side as the inlet, by running the conveyor belt either from left-to-right for a left side inlet, or from right-to-left for a right side inlet. To be most successful in such interchangeable applications, it is particularly desirable to have greater control over the heating and temperature profile of a conveyor oven along the length of the conveyor oven tunnel.

SUMMARY

Some embodiments of the present invention provide a conveyor oven for cooking food, the conveyor oven comprising an oven chamber in which food is cooked; a conveyor moveable to convey the food within the oven chamber; a burner assembly operable to emit a flame to heat air for convection cooking of food moving within the oven chamber on the conveyor; a burner tube extending into a compartment and positioned to receive at least a portion of the flame emitted by the burner assembly; a first passive tube and a second passive tube in the compartment positioned opposite the burner tube, wherein the first and second passive tubes each include an end opposite and facing the burner tube and an outer wall; a baffle strip extending between the first and second baffle tubes; and a fan in fluid communication with the compartment and operable to deliver heated air from the compartment to the oven chamber for convection cooking of food moving through the oven chamber on the conveyor.

In some embodiments, a conveyor oven for cooking food is provided, and comprises an oven chamber in which food is cooked; a conveyor moveable to convey the food within the oven chamber; a burner assembly operable to emit a flame to heat air for convection cooking of food moving within the oven chamber on the conveyor; a burner tube extending into a compartment and positioned to receive at least a portion of the flame emitted by the burner assembly; a passive tube in the compartment positioned opposite the burner tube, wherein the passive tube includes an end opposite and facing the burner tube and an outer wall; a baffle plate positioned between the passive tube and the burner tube; and a fan assembly in fluid communication with the compartment and operable to deliver heated air from the compartment to the oven chamber for convection cooking of food moving through the oven chamber on the conveyor.

Some embodiments of the present invention provide a conveyor oven for cooking food, the conveyor oven comprising: a housing having an oven chamber in which food is cooked; a conveyor moveable to convey the food within the oven chamber; a burner assembly operable to emit a flame to heat air for convection cooking of food moving within the oven chamber on the conveyor; a burner tube extending into a compartment and positioned to receive at least a portion of the flame emitted by the burner assembly; a passive tube in the compartment positioned opposite the burner tube; a first shelf positioned in the housing, in fluid communication with the compartment, and movable with respect to the compartment; a second shelf positioned in the housing, in fluid communication with the compartment, and movable with respect to the compartment; a first fan or a first motor attached to the first shelf and movable with the first shelf with respect to the compartment; and a second fan or a second motor attached to the second shelf and movable with the second shelf with respect to the compartment; wherein the first and second shelves are both located in the housing higher than the burner tube and the passive tube, or are both located in the housing lower than the burner tube and the passive tube; and wherein the first shelf is independently moveable with respect to the second shelf.

BRIEF DESCRIPTION OF THE DRAWINGS

The aspects and features of various exemplary embodiments will be more apparent from the description of those exemplary embodiments taken with reference to the accompanying drawings.

FIG. 3 is a rear perspective view of the conveyor oven of FIG. 1.

FIG. 4 is a right side view of the conveyor oven of FIG. 1.

FIG. 5 is a left side view of the conveyor oven of FIG. 1.

DETAILED DESCRIPTION

Figure 1:
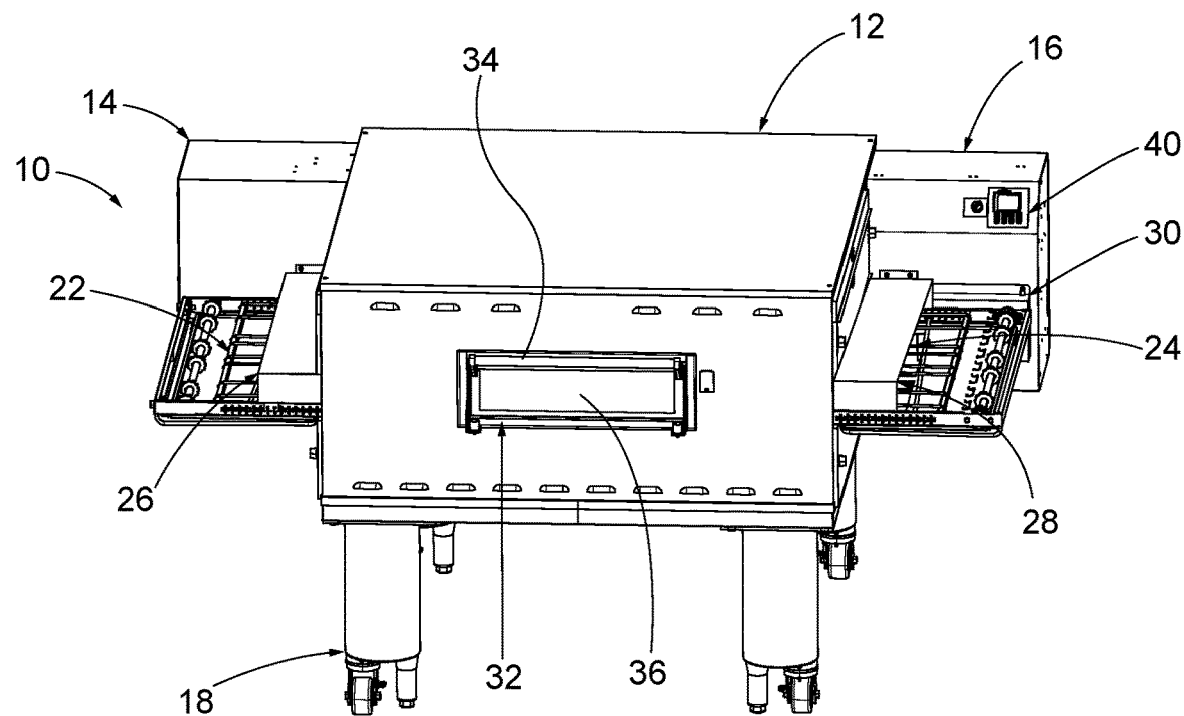
FIG. 1 is a front perspective view of an exemplary conveyor oven according to an embodiment of the present invention.

FIGS. 1-5 shows a conveyor oven 10 having an oven housing 12, a burner housing 14 positioned on a first side of the oven 10, and a control housing 16 positioned on a second side of the oven 10. One or more leg assemblies 18 extend from the bottom of the housing 12. A conveyor 22 runs through a heated tunnel 24 of the oven 10. A raw food product can be placed on the conveyor 22 and moved through the oven 10 to exit as a cooked food product.
Conveyors The conveyor 22 has a width generally corresponding to the width of the heated tunnel 24, and is designed to travel in a first direction A, from left oven end 26 toward right oven end 28, or alternatively in the opposite direction B, from right oven end 28 toward left oven end 26. Thus, oven ends 26 and 28 may serve respectively as the inlet and outlet of an oven with a rightwardly moving conveyor 22 or as the outlet and inlet of an oven with a leftwardly moving conveyor 22.

The support, tracking and drive of conveyor 22 are achieved using conventional techniques as would be understood by one of ordinary skill in the art. A drive mechanism is housed within a drive compartment 30 connected to the control housing 16. The speed at which the conveyor 22 moves can be coordinated with the temperature in the heated tunnel 24 so that the emerging food product is properly cooked.

Normally, only one conveyor 22 is used, as shown. Certain specialized applications, however, may make two or more conveyors a preferable design. For example, a first conveyor may begin at left oven end 26 and travel at one speed to the center or other location of the oven 10, while a second conveyor beginning at such a location and ending at the right oven end 28 may travel at a different speed. Alternatively, conveyors that are split longitudinally may be used, so that one conveyor carries a product in direction A, while the other conveyor carries a product in direction B, or so that two side-by-side conveyors carry product in parallel paths and in the same direction (A or B) through the oven 20. This enables one product to travel on the conveyor 22 at one speed to cook one kind of product and the other conveyor to travel on the other conveyor at a different speed to cook another kind of product. In addition, three or more side-by-side conveyors can carry product in parallel paths through the oven 10.

Auxiliary Door

Figure 2:
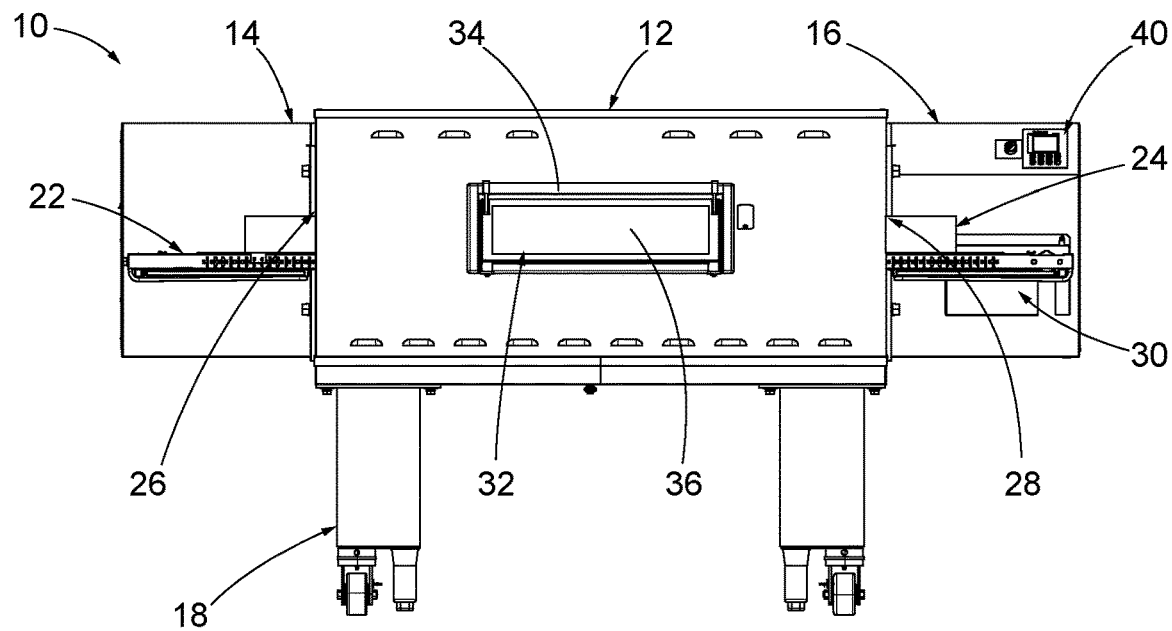
FIG. 2 is a front view of the conveyor oven of FIG. 1.

FIGS. 1 and 2 best show a hinged door 32 provided on the front of the oven 10 and having a handle 34 and a heat resistant glass panel 36 so that a person operating the oven can view food product as it travels through the oven 10. A stainless steel metal frame surrounds the oven opening and provides a support for a gasket of suitable material (not shown), so that when the door 32 is in its closed position, the door 32 fits against and compresses the gasket to retain heat in the oven 10. An operator may open the door 32 by pulling on handle 34 to place a different product on the conveyor 22 if less than a full cooking cycle is required to produce a fully cooked product.

Oven Controls

Figure 6:
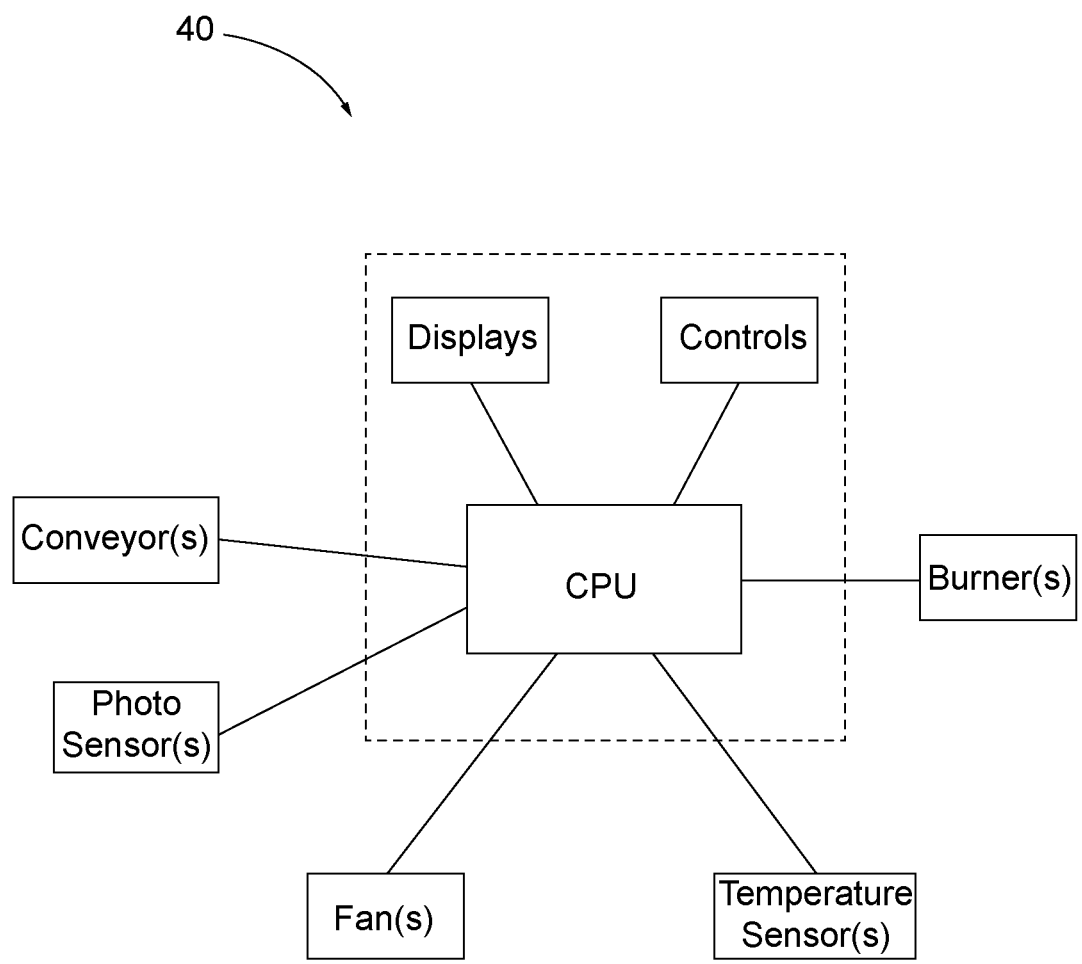
FIG. 6 is a schematic view of an exemplary control assembly for the conveyor oven of FIG. 1.

The control housing 16 contains a control assembly 40 for the oven 10. FIG. 6 shows a schematic illustration of the control system for the oven 10. A microprocessor-based controller can be used, and can include a central processing unit ("CPU"), one or more displays, and a control interface. The CPU can control a plurality of devices including one or more burners (including one or more blower switches, ignition switches and blowers, fuel valves, and flame sensing elements), one or more fans, and one or more conveyors 22. The CPU may also receive input from a plurality of sensors including one or more temperature sensors and one or more photo sensors.

The oven controls can include a controller (such as a Honeywell UDC 3300 controller) which may be programmed to control and monitor the cooking process by pressing appropriate set-up and display buttons while viewing an alphanumeric display, which will display process variables and setpoints including oven temperature, hot air blower speed, etc. A "heat on" indicator can be illuminated when a minimum threshold heat output is generated by the oven 10 under control of the controller. The present temperature and/or a programmed setpoint temperature may be displayed. By simultaneously pressing selected keys, the value of the heat output with the heat on indicator in the "on" condition can be displayed. Also, the controller can be configured to enable a user to cycle through actual temperature display indicators to reveal actual temperature(s), setpoint temperature(s), and the heat on condition. In the illustrated embodiment, the speed and direction of the conveyor 22 can be set using the controller.

Heat Delivery System

Figure 7:
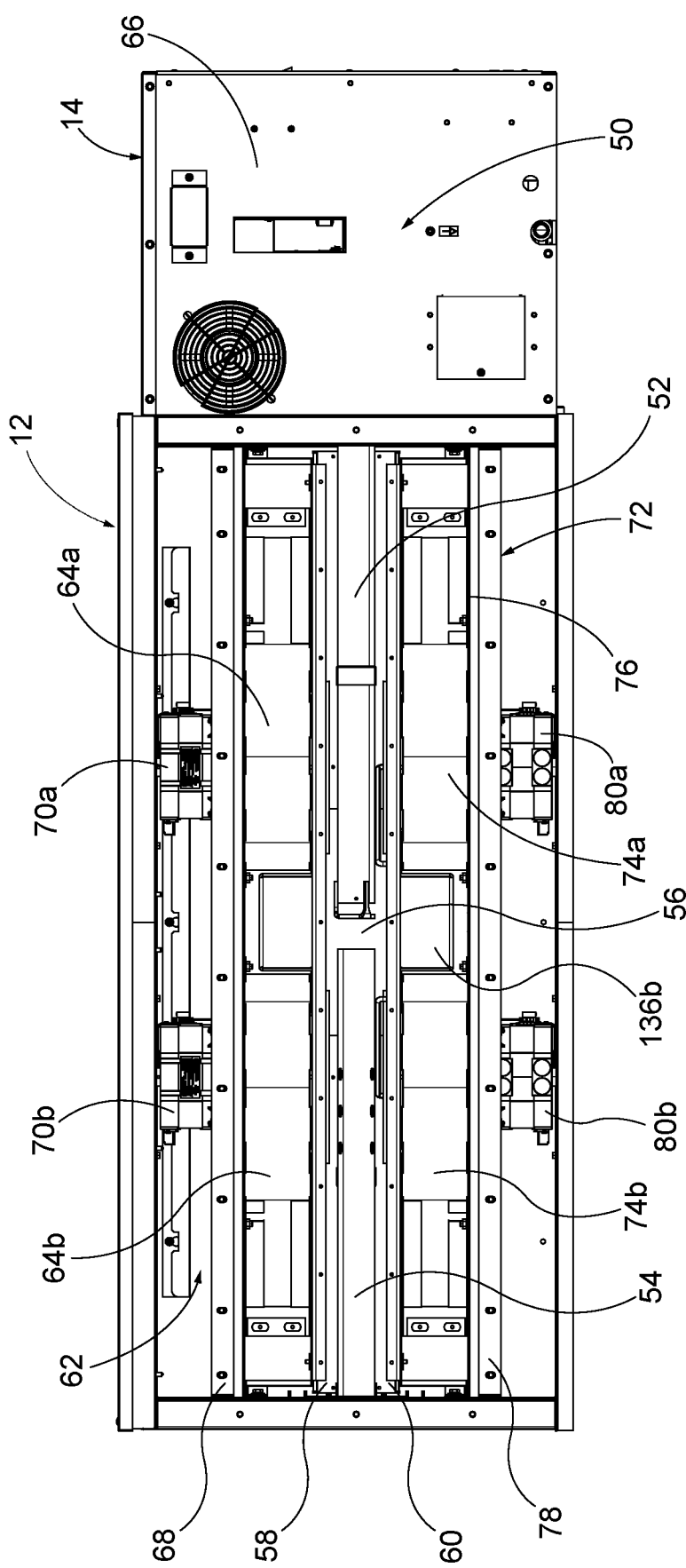
FIG. 7 is a rear view of an exemplary heat distribution assembly used in the conveyor oven of FIG. 1.

FIG. 7 shows exemplary components involved with the heat delivery system for the oven 10, which is configured to provide convection heating to the tunnel 24 and food products traveling therethrough. The illustrated heat delivery system includes a burner assembly 50 positioned in the burner housing 14. The burner assembly 50 is configured to supply heat through a set of burner tubes 52 which extend into the oven parallel to the tunnel 24. A baffle assembly is positioned opposite the burner tubes 52. In this embodiment, the baffle assembly includes a set of passive tubes 54. The burner tubes 52 and the passive tubes 54 are positioned in a compartment 56 at least partially defined by a first upper shelf 58 and a first lower shelf 60. By utilizing a burner assembly 50 and associated burner tubes 52 on only one side of the conveyor oven 10 as shown (e.g., on an upstream end of the conveyor oven 10) and using passive tubes 54 on the other side of the conveyor oven 10, gas lines, electrical lines, and related hookups are only needed on one side of the conveyor oven 10. This can significantly reduce the cost and complexity of manufacturing, servicing, and installing the conveyor oven 10.

An upper fan assembly 62 includes a first fan 64A and a second fan 64B positioned in an upper chamber 66 above the compartment 56. The upper chamber 66 is at least partially defined by the first upper shelf 58 and a second upper shelf 68. A first motor 70A and a second motor 70B are connected to the second upper shelf 68, and drive the first and second fans 64A, 64B, respectively.

A lower fan assembly 72 includes a third fan 74A and a fourth fan 74B positioned in a lower chamber 76 below the compartment 56. The lower chamber 76 is at least partially defined by the first lower shelf 60 and a second lower shelf 78. A third motor 80A and a fourth motor 80B are connected to the second lower shelf 78 and drive the third and fourth fans 74A, 74B, respectively.

In some embodiments, controlled desired heating and temperature profiles from one end of the tunnel 24 to the other is achieved by apportioning the tunnel 24 into two or more segments, and by providing independent temperature sensing and independent delivery of heated air to each segment. For example, the first fan 64A and the third fan 74A can be controlled to deliver heated air to a first oven segment, and the second fan 64B and the fourth fan 74B can be controlled to deliver heated air to a second oven segment. In some embodiments, the first fan 64A and the third fan 74A are dependently controlled (that is, have the same duty cycle and/or fan speeds) to provide controlled heat to the first tunnel segment. Similarly, the second fan 64B and the fourth fan 74B can be dependently controlled (that is, have the same duty cycle and/or fan speeds) to provide controlled heat to the second tunnel segment. In other embodiments, the first and second fans 64A, 64B are dependently controlled (that is, have the same duty cycle and/or fan speeds) to provide controlled heat to upper areas of the tunnel 24, such as to areas of the tunnel 24 above the conveyor 22. Similarly, the third and fourth fans 74A, 74B can be dependently controlled (that is, have the same duty cycle and/or fan speeds) to provide controlled heat to lower areas of the tunnel 24, such as to areas of the tunnel 24 below the conveyor 22. In some embodiments, each of the fans 64A, 64B, 74A, 74B can be independently controlled for both duty cycle and/or fan speed.

Control of the fans 64A, 64B, 74A, 74B can be based at least in part upon one or more temperatures sensed within the oven 10 (such as a temperature sensor positioned within each fan housing downstream of the fan impeller, temperature sensors located in or adjacent the tunnel 24 to detect the temperature of air at different locations in the tunnel, temperature sensors mounted near the left end 26 of the oven tunnel, the right end 28 of the oven tunnel, or at other points therebetween, or temperature sensors positioned in the compartment 56 or at other points along the airflow path), one or more detected or calculated positions of food products within, entering, or exiting the oven 10, and/or the passage of one or more predetermined periods of time. In that regard, one or more position sensors (not shown) can be located to detect the position of food product on the conveyor 22 in place of or in addition to any of the above-mentioned temperature sensors, and can thereby control one or more operations of the oven 10 as a result of such position detection.

To provide control over fan speed based upon any of these factors, the motors 70A, 70B, 80A, 80B can be operatively connected to and controlled by the control assembly 40. In some embodiments, the fans 64A, 64B, 74A, 74B are driven by variable-speed motors 70A, 70B, 80A, 80B coupled to and controlled by the control assembly 40. Power can be supplied to each variable-speed motor 70A, 70B, 80A, 80B by, for example, respective inverters (not shown). In some embodiments, each inverter is a variable-speed inverter supplying power to the motor 70A, 70B, 80A, 80B at a frequency that is adjustable to control the speed of the motor 70A, 70B, 80A, 80B and, therefore, the speed of the fans 64A, 64B, 74A, 74B. An example of such an inverter is inverter Model No. MD60 manufactured by Reliance Electric (Rockwell Automation, Inc.).

In some embodiments, the first tunnel segment can extend from the left oven end 26 substantially to a midpoint of the tunnel 24, whereas the second tunnel segment can extend from the first tunnel segment to the right oven end 28. The temperatures in each tunnel segment can be monitored by temperature sensors as described above (e.g., thermocouples or other temperature sensing elements, not shown). Furthermore, in those embodiments in which the oven 10 is heated by one or more gas burners, one or more gas output sensors (not shown) can be positioned to detect the amount of fuel supplied to the oven 10. This information can be provided to the control assembly 40 in order to control one or more operations of the oven 10, such as to turn the conveyor 22 and/or fans 64A, 64B, 74A, 74B on or off, and/or to adjust the speed of the conveyor 22 and/or fans 64A, 64B, 74A, 74B.

During operation, air in the compartment 56 is heated by the burner tubes 52. The upper and lower fan assemblies 62, 72 draw air through the compartment 56 and direct it to the tunnel 24. In certain embodiments, burner tubes 52 positioned on a single side of the compartment 56 are sufficient for supplying heat to the tunnel 24. While this saves energy, having an open space in the remainder of the compartment 56 can create a pressure differential which can result in an undesirable temperature difference between the tunnel segments, and therefore uneven heating. The baffle (passive tubes, in the illustrated embodiment) can be positioned in the compartment 56 opposite the burner tubes 52 to help reduce or eliminate the pressure differential, and allow for greater control over airflow and temperature across the oven 10.

Burner Assembly

Figure 8:
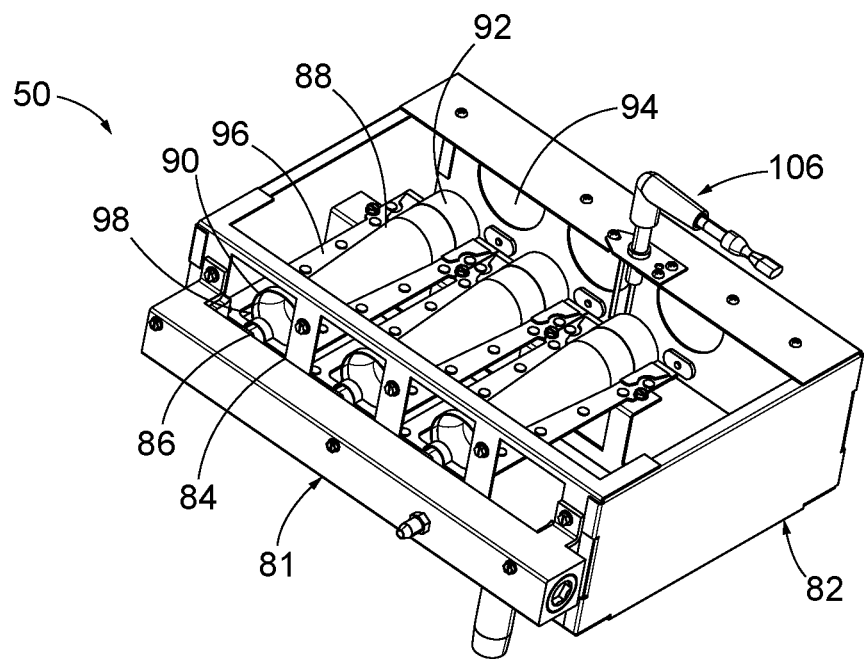
FIG. 8 is a top perspective view of exemplary burner assembly components used in the heat distribution assembly of FIG. 7.
Figure 12:
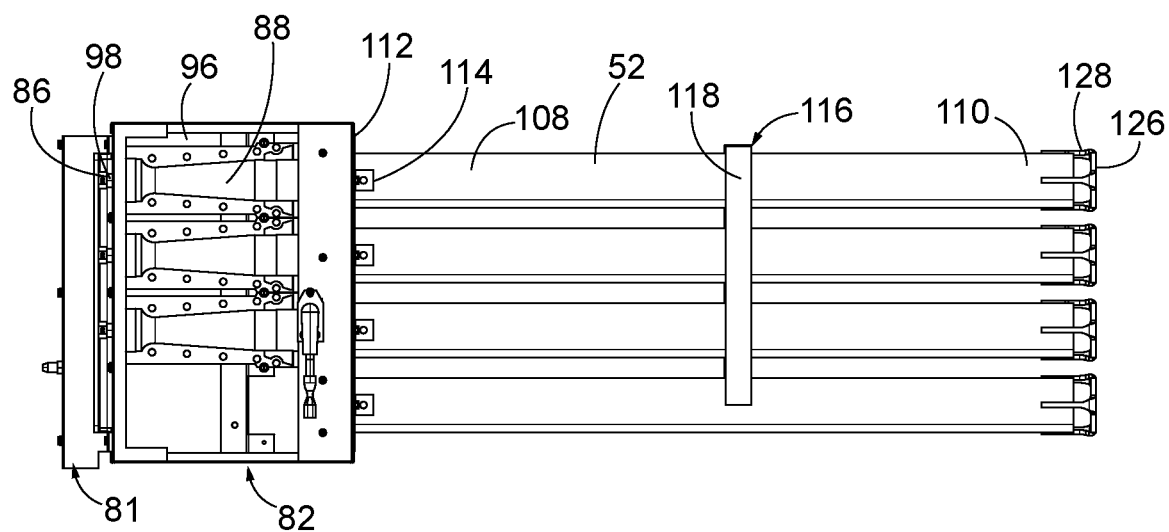
FIG. 12 is a top view of some of the burner assembly components from FIG. 8, shown with exemplary burner tubes.
Figure 13:
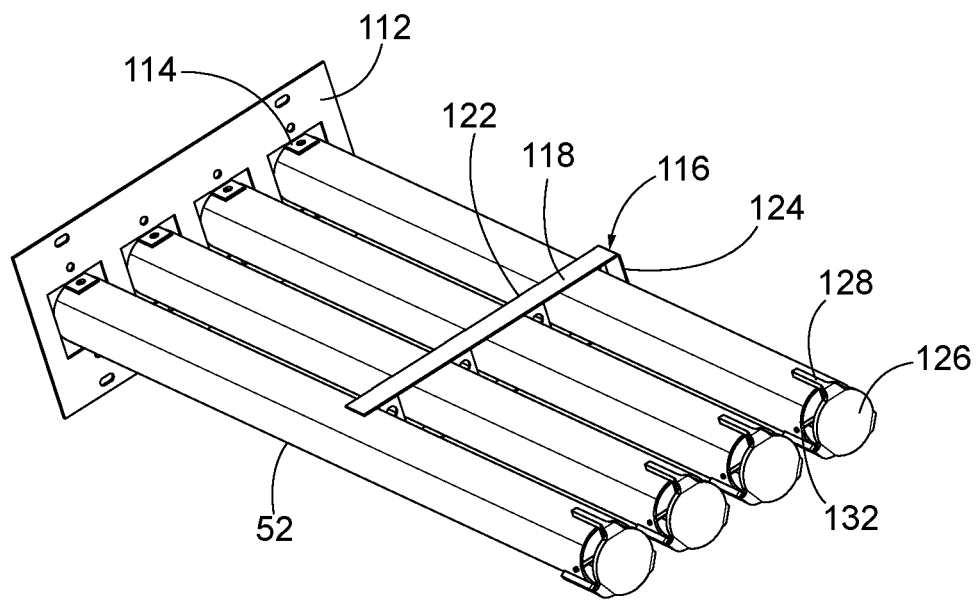
FIG. 13 is a front perspective view of the burner tubes shown in FIG. 12.

A burner assembly 50 is positioned in the burner housing 14 adjacent the burner tubes 52. FIG. 8 shows a portion of an exemplary embodiment of the burner assembly 50 having a gas supply manifold 81 extending into a venturi housing 82. Other components can be associated with the burner assembly 50 depending on the required heat output and control components, as would be understood by one of ordinary skill in the art. The top of the venturi housing 82 has been removed in FIG. 8 to show the components therein. The illustrated venturi housing 82 has a set of inlet openings 84 in communication with the gas supply manifold 81, and through which a series of nozzles 86 provides gas to the venturi tubes 88. In the illustrated embodiment, the nozzles 86 are spaced from the venturi tubes 88 to allow air to mix with the gas prior to ignition. The amount of gas supplied by the nozzles 86 can be controlled to adjust the heat output of the burner assembly 50. Each of the venturi tubes 88 of the illustrated embodiment has a proximal end 90 facing a respective nozzle 86, and a distal end 82 facing a set of outlet openings 94 of the venturi housing 82. Also with reference to the illustrated embodiment, the outlet openings 94 are aligned with respective burner tubes 52, as best shown in FIG. 12.

Figure 9:
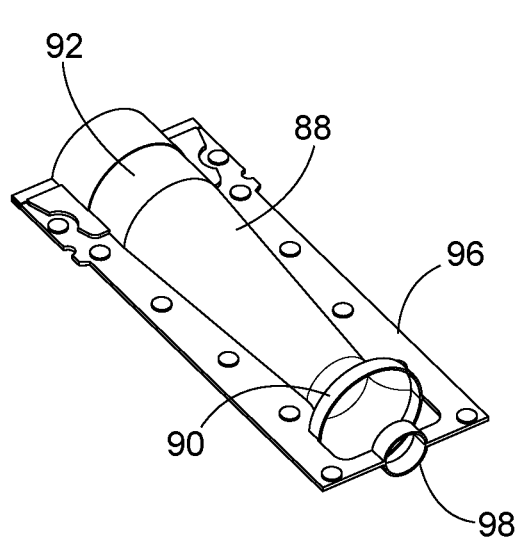
FIG. 9 is a rear perspective view of an exemplary venturi tube of the burner assembly of FIG. 8.
Figure 10:
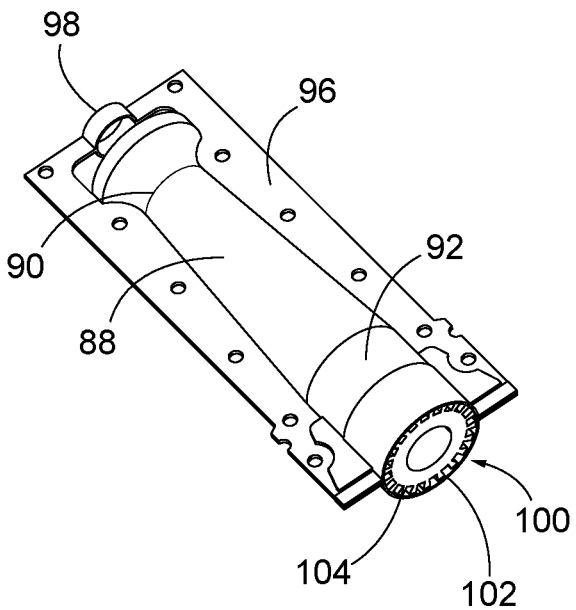
FIG. 10 is a front perspective view of the venturi tube of FIG. 9.
Figure 11:
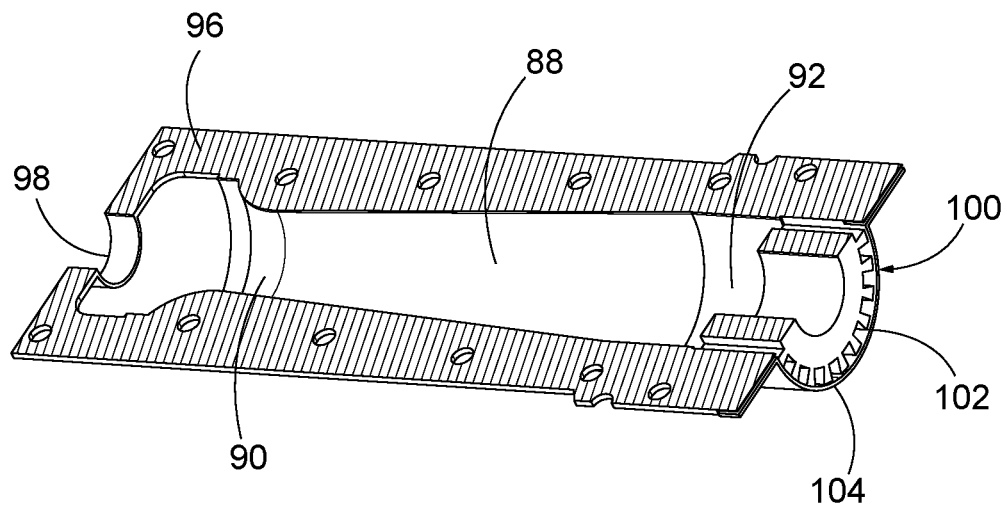
FIG. 11 is a sectional view of the venturi tube of FIG. 10.

FIGS. 9-11 show an exemplary embodiment of a venturi tube 88. In the illustrated embodiment, the venturi tube has an outer flange 96 extending from an outer wall of the venturi tube 88. The outer flange 96 can include a ring 98 that receives a gas supply nozzle 86 (described above). The flange 96 can be used to connect the venturi tube 88 to the venturi housing 82. For example, the flange 96 can be connected to a bracket or other structure associated with the venturi housing 82 using one or more fasteners. The venturi tube 88 can also be connected through a joining process, such as spot welding, or in any other suitable manner.

In some embodiments, each venturi tube 88 has a flame retention member 100 which can help prevent lift-off of flame from the distal end 92 of the venturi tube 88. FIGS. 10 and 11 show an exemplary embodiment of a flame retention member 100 comprising an inner ring 102 spaced from the inside diameter of the venturi tube 88, thereby defining an annular space between the ring 102 and the inside diameter of the venturi tube 88. The ring 102 can be permanently or releasably retained in place with respect to the venturi tube 88 in a number of different manners, such as by one or more fingers, pins, clips, or other fasteners, by an apertured disc, and the like. In the illustrated embodiment, the ring 102 is retained in place by a plurality of crenelated projections 104 extending from the ring 102 and abutting the inside diameter of venturi tube 88. Also with reference to the illustrated embodiment, the ring 102 is held in place by a friction fit between the projections 104 and the venturi tube 88 and/or between the projections 104 and the ring 102. The projections 104 can be unitarily formed with the ring 102, or formed as a separate member. The ring 102 and projections 104 can also be integrally formed, for example through one or more molding or casting procedures with the venturi tube 88. Different sizes, shapes, and configurations of the projections 104 and the ring 102 can be used.

Ignition of a gas/air mixture exiting the venturi tubes 88 can be accomplished in a number of ways. FIG. 8 shows an exemplary embodiment in which a single igniter 106 is positioned in front of one of the venturi tubes 88. The illustrated igniter 106 is electrically powered and capable of producing a spark that ignites the gas/air mixture stream exiting one or more of the venturi tubes 88. In some embodiments, once one of the streams from the venturi tube 88 has been lit, the flame produced can cross over to ignite the remaining streams. In other exemplary embodiments, an igniter can be positioned in front of each venturi tube 88. The burner assembly 50 can be provided with a flame or heat sensor as a fail-safe measure to shut off the gas supply should any of the streams fail to ignite. In some embodiments, each venturi tube 88 is provided with a respective sensor that can trigger gas shut-off when no flame is detected from the corresponding venturi tube, such as after a sufficient period of gas supply time has elapsed.

As best shown in FIG. 12, each of the illustrated venturi tubes 88 is aligned with a burner tube 52. The resulting flame produced by each venturi tube 88 is configured to extend at least partially into the aligned burner tube 88. In the illustrated embodiment, three venturi tubes 88 are used with four burner tubes 52. The burner tube 52 not associated with a venturi tube 88 can act as a passive tube or baffle to normalize air flow through the compartment 56. If a greater heat output is needed for the oven 10, a burner assembly having four venturi tubes 88 and four nozzles 86 can be substituted and used with the burner tubes 52 already in place. Other embodiments can include fewer or more venturi tubes 88 and burner tubes 52, and also different ratios of venturi tubes 88 to burner tubes 52 as needed to create a desired heat output.

Burner Tubes

Figure 17:
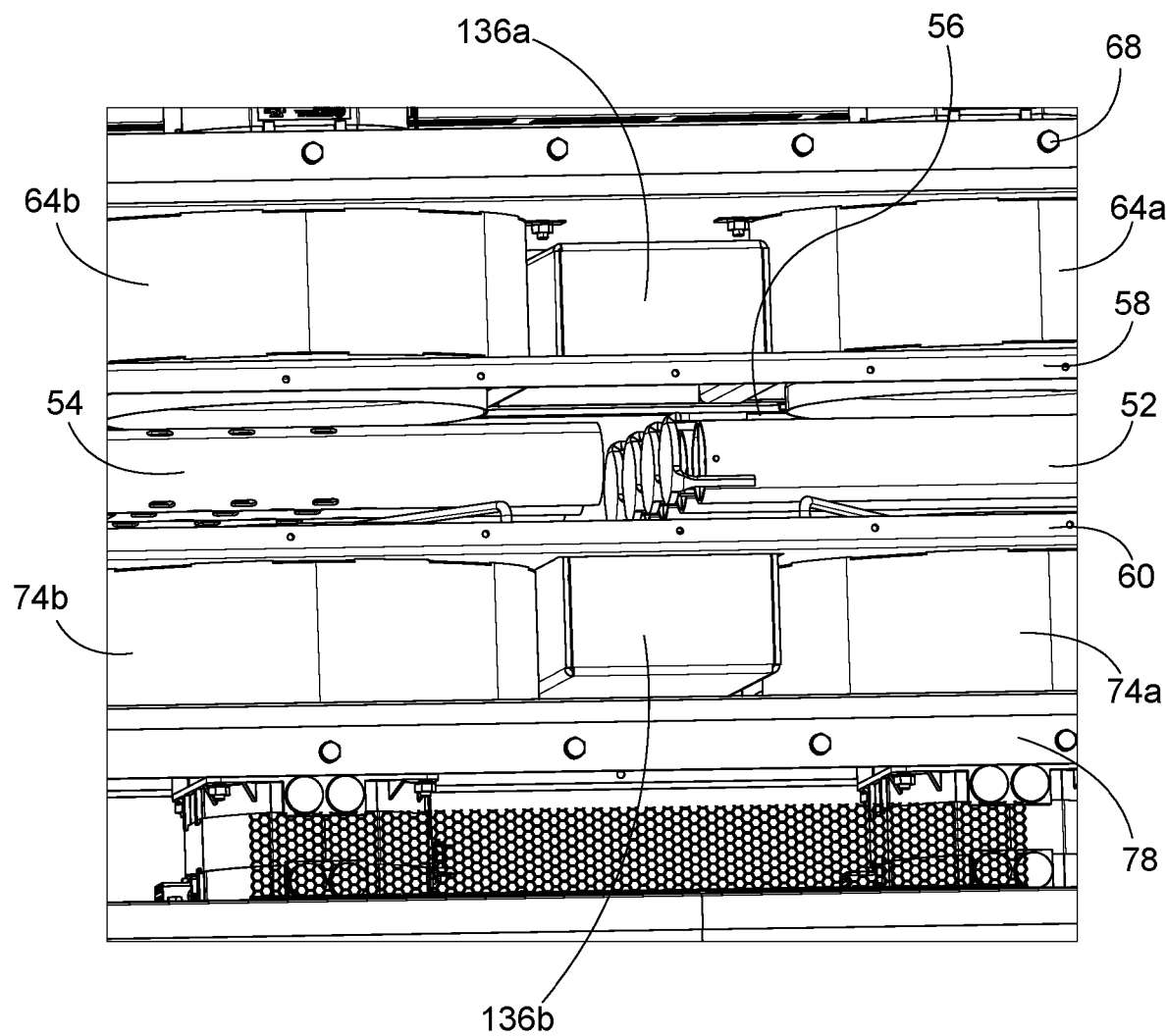
FIG. 17 is a partial view of the heat distribution assembly shown in FIG. 7.

FIGS. 12-15 show an exemplary set of four burner tubes 52 with each tube having a proximal end 108 facing the burner assembly 50 and a distal end 110 positioned in the compartment 56 (see FIG. 7). The illustrated burner tubes 52 are connected together and to the venturi housing 82 of the burner assembly 50 at the proximal end 108 by a mounting bracket 112. The mounting bracket 112 can have a substantially rectangular configuration, such as that shown in FIGS. 12-15, with an opening for receiving each burner tube 52. A tab 114 can extend from the top and bottom of each opening to facilitate a joining connection between the tubes 52 and the mounting bracket 112, for example a welded connection. Other connections between the burner tubes 52 and the mounting bracket 112 (e.g., fasteners, welding, and the like) can also or instead be used. In some embodiments, a second bracket 116 can be positioned between the proximal and distal ends 108, 110 of the burner tubes 52 to help stabilize the burner tubes 52. In the illustrated embodiment, the second bracket 116 includes an upper bar 118 connected to the tops of the burner tubes 52, a lower bar 120 connected to the bottoms of the burner tubes 52, side bars 122 extending between each burner tube 52, and at least one outer bar 124 positioned outside of at least one of the end burner tubes 52. The mounting bracket 112 can be configured to be removably connected to the side of the oven 10, for example using fasteners, as shown in FIG. 17. In such embodiments, with the mounting bracket 112 disconnected, the entire burner tube assembly can be removed from the oven 10 as a single unit.

In some embodiments, a target 126 is positioned opposite (and can be spaced from) the distal end 110 of each burner tube 52. In certain instances, flame from the burner assembly 50 can travel through the burner tube 52, in which case the target 126 can help to disperse the flame as it leaves the tube 52. The target 126 can be retained in this position with respect to the burner tube 52 in any manner, including through welding or any other suitable joining process, fasteners, and the like. In the illustrated embodiment, the target 126 is held in place by arms 128 extending from the target 126 to the surface of the burner tube 52. The arms 128 can be permanently or releasably attached to the outer tube 52 and/or to the target 126 in any suitable manner, such as by welding, brazing, or riveting, by one or more snap-fits or other inter-engaging element connections, by clips, clamps, screws, or other fasteners, and the like. The illustrated target 126 has a substantially flat disc shape, although other shapes can be used, including a convex shape with an apex extending generally toward the distal end 110 of the burner tube 52.

Figure 14:
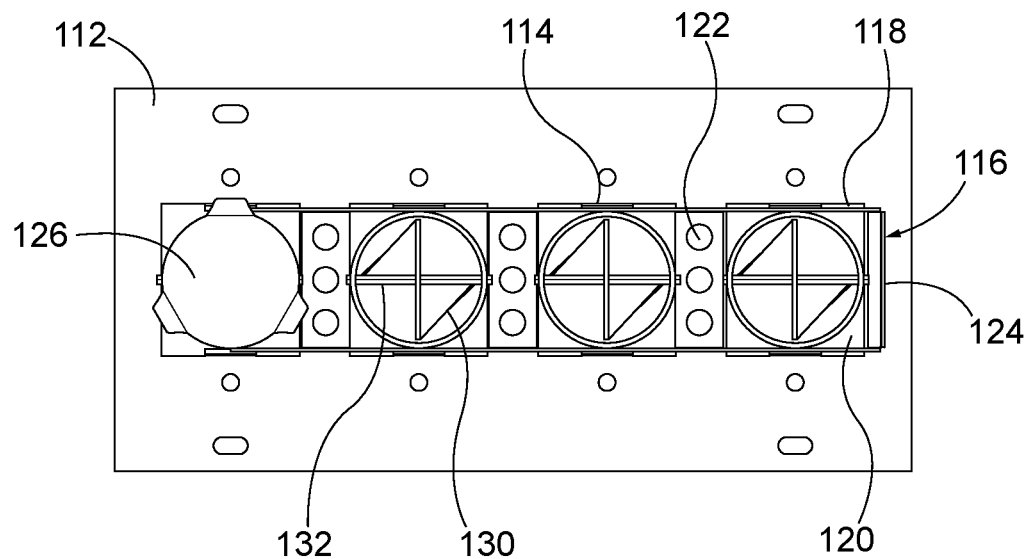
FIG. 14 is a front view of the burner tubes of FIG. 13, shown with three of the targets removed.
Figure 15:
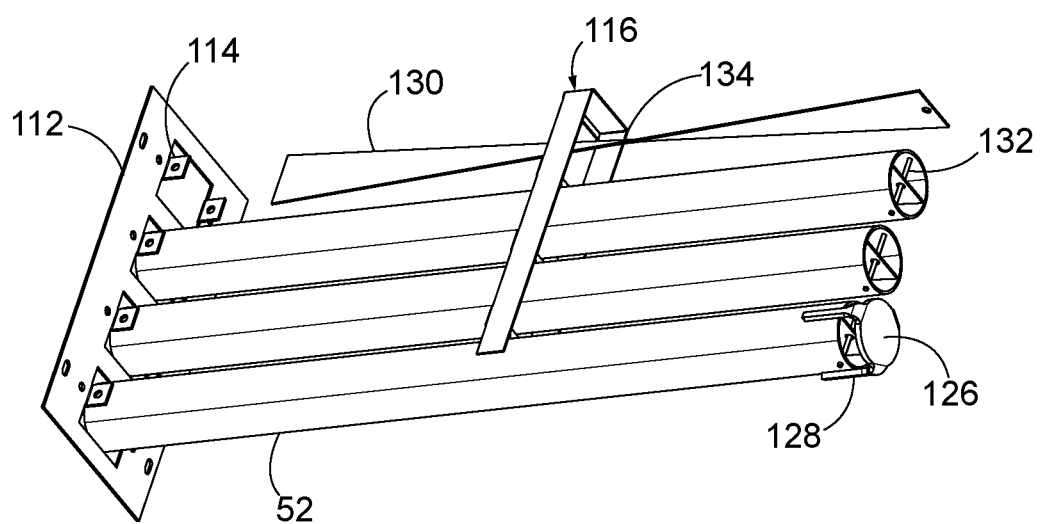
FIG. 15 is a top perspective view of the burner tubes of FIG. 14, shown with one of the burner tubes removed.

In certain embodiments, a rifling plate 130 extends through the inside of the burner tube 52 as shown in FIGS. 14 and 15. The rifling plate 130 is twisted about a longitudinal axis. FIG. 15 illustrates the outer tube hidden to show the configuration of the rifling plate 130 as it extends through the tube. The rifling plate 130 includes a single full rotation about a central point 134. In other embodiments, the rifling plate 130 can include additional full rotations. Each rifling plate 130 can extend along the entire length or any portion of the entire length of the burner tube 52. For example, FIG. 15 shows an exemplary embodiment in which the rifling plate 130 does not extend fully to the opening in the proximal end 108 in the burner tube 52. The rifling plate 130 can improve gas and air to mix within the burner tube 52 for more complete gas combustion, and in some embodiments can improve the quality of the flame generated within the burner tube 52.

In some instances, the length of the rifling plate 130 can vary significantly at different states of the burner assembly 50 based upon the temperature of the rifling plate 130. For example, when the burner assembly 50 is off and no flames are sustained, the rifling plate 130 can have a relatively short length compared to when the burner assembly 50 is on and the rifling plates 130 are heated significantly by flames in the burner tubes 52. As the rifling plates 130 heat up, they can extend in length to the point where they extend out of the distal ends 110 of the burner tubes 52 and even into contact with the targets 126. If the rifling plates 130 extend over a certain point, they can begin to exert excessive force on the targets 126. Such excessive force can damage the rifling plates 130 or the connections of the rifling plates 130 to the burner tubes 52. In the illustrated embodiment, a fastener (e.g., pin 132) extends through an opening in a distal end of the rifling plate 132, and is connected to the distal end 110 of the burner tube 52. The pin 132 can extend through the opposite sides of the burner tube 52 and/or be connected through a joining process or additional fasteners. By virtue of a such a connection in which the distal end of the rifling plate 132 is attached to the distal end of the burner tube 52 (and in some cases, via a pin or fastener extending through or integral with the distal end of the rifling plate 130), the rifling plate 130 is permitted to lengthen and shorten at different temperatures without damage to the rifling plate 130 or the rifling plate 130 mounting connection(s). In some embodiments, the rifling plate 130 expands (lengthens) in the direction of the burner assembly 50 by virtue of the connection between the rifling plate 130 and the distal end 100 of the burner tube 52.

Figure 16:
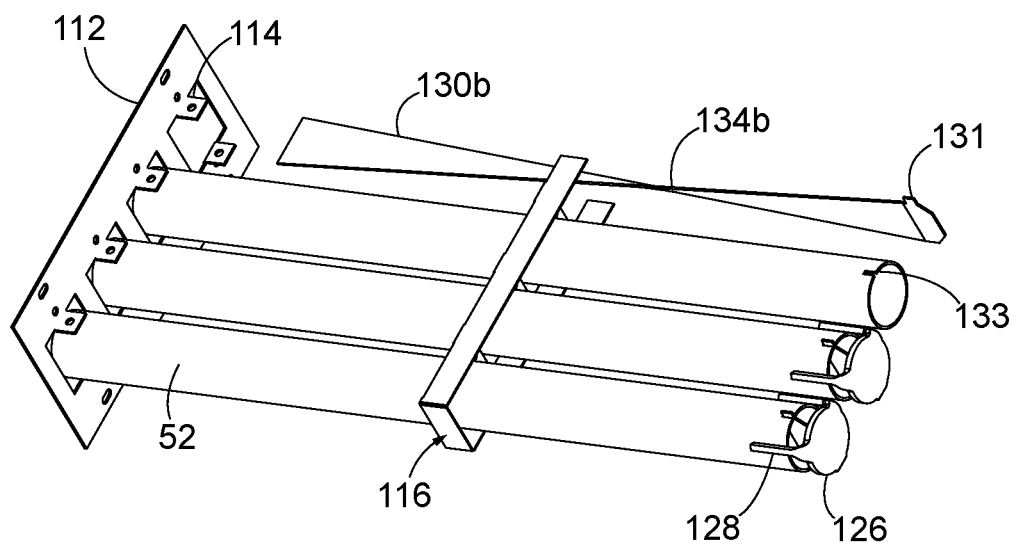
FIG. 16 is a top perspective view of an alternative embodiment of the burner tubes and rifling plates of FIG. 15.

FIG. 16 shows an alternative embodiment of a set of rifling plates 130B extending through a set of burner tubes 52. The rifling plate 130B includes a 90° rotation about a central point 134B. In other embodiments, the rifling plate 130B can include one or more full rotations, or any amount less than one full rotation. Each rifling plate 130B can extend along the entire length or any portion of the entire length of the burner tube 52. FIG. 16 shows an exemplary embodiment in which the rifling plate 130B does not extend fully to the opening in the proximal end 108 in the burner tube 52. This helps prevent the rifling plate 130B from expanding and interfering with the burner assembly 50.

Instead of the pin 132 connection shown in FIG. 15, the rifling plate 130B of FIG. 16 includes a projection 131 extending from the main body of the plate in the radial direction relative to the tube. The projection 131 is located at or near the distal end of the rifling plate 130B. As shown in the exemplary embodiment, the end of the rifling plate 130B extends past the projection 131 and includes a pair of chamfered edges. A slot 133 is formed in the top of the burner tube 52 to receive the projection 131. During expansion of the rifling plate 130B, the projection 131 can move axially in the slot 133, reducing the stress applied to the burner tube 52. In some embodiments, the distance between the distal end of the rifling plate 130B and the target 126 is less than the length of the slot 133 so that the projection 131 will not disengage the slot 133 if the rifling plate 130B expands to the point where the rifling plate 130B contacts the target 126. This axial movement allows for some expansion of the rifling plate 130B without it dislodging from the burner tube 52 or exerting an excessive force on the burner tube 52 or target 126. The chamfered end of the rifling plate 130B reduces interference of airflow through the burner tube 52, including in cases where the rifling plate 130B has expanded to the point where the rifling plate 130B contacts the target 126. Although shown at the top, the projection 131 and the slot 133 can be at any radial position on the burner tube 52. Also, more than one projection 131 and slot 133 can also be used.

Instead of the pin 132 connection shown in FIG. 15, the rifling plate 130B includes an ear 131 extending from the main body of the plate in the radial direction relative to the tube. The ear 131 is placed at or near the distal end of the rifling plate 130B. A slot 133 is formed in the top of the burner tube 52 to receive the ear 131. During expansion of the rifling plate 130B, the ear 131 can move axially in the slot 133, reducing the stress applied to the burner tube 52. Although shown at the top, the slot can be at any radial position on the burner tube 52.

Flame Traps

Figure 18:
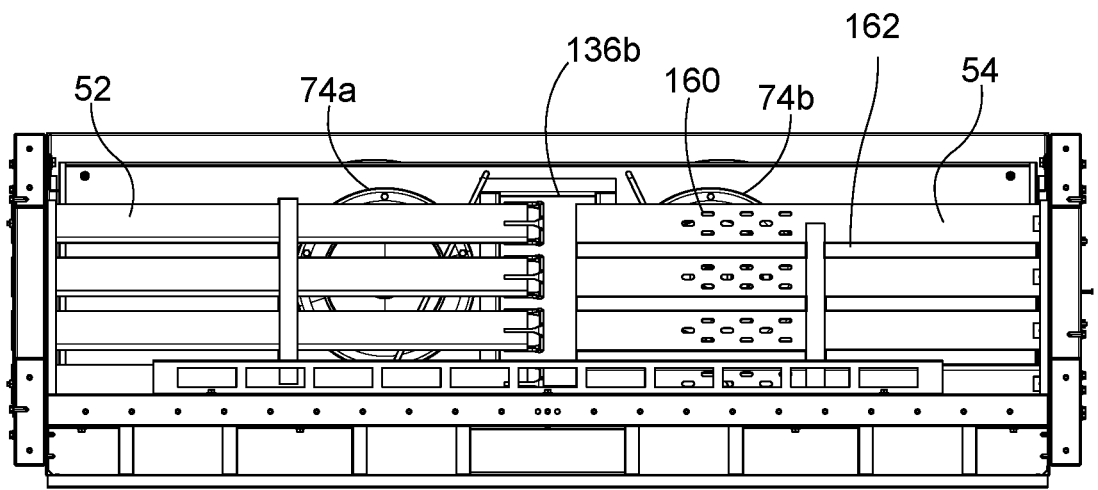
FIG. 18 is a top view of the heat distribution assembly of FIG. 7, shown with the upper fan assembly removed.

FIGS. 17 and 18 show the burner tubes 52 and the passive tubes 54 connected to respective sides of the oven 10 and extending into the compartment 56. As mentioned above, it is possible under certain circumstances for the flame from the burner assembly 50 to travel through the burner tubes 52. In extreme cases, the flame can enter the compartment 56 and be drawn into one or more of the fans 64A, 64B, 74A, 74B. To prevent this from happening, one or more flame traps can be positioned in the compartment 56 or in fluid communication with the compartment 56. Such traps define receptacles positioned in such a manner as to receive the flame extending out of an adjacent burner tube 52.

In the illustrated embodiment by way of example, an upper flame trap 136A is positioned between the first fan 64A and the second fan 64B, and a lower flame trap 136B is positioned between the third fan 74A and the fourth fan 74B. The upper flame trap 136A extends through the first upper shelf 58, and the lower flame trap 136B extends through the first lower shelf 60, although other flame trap positions and mounting configurations can be used as desired. In various exemplary embodiments, such as the illustrated embodiment, the upper and lower flame traps 136A, 136B each include a receptacle having a plurality of side walls, a base, and an opening in communication with the compartment 56. If flames exit the burner tubes 52, they will enter the flame traps 136A, 136B, preventing them from traveling along the exterior of the burner tubes 52 or the passive tubes 54 and into one of the fans 64A, 64B, 74A, 74B. Additional structure can be provided that helps the flame traps 136A, 136B to disburse, deflect, or otherwise alter the path of a flame exiting the burner tubes 52. For example, different screens or baffles can be provided inside of, or extending from, the flame traps 136A, 136B.

Passive Tubes

Figure 19:
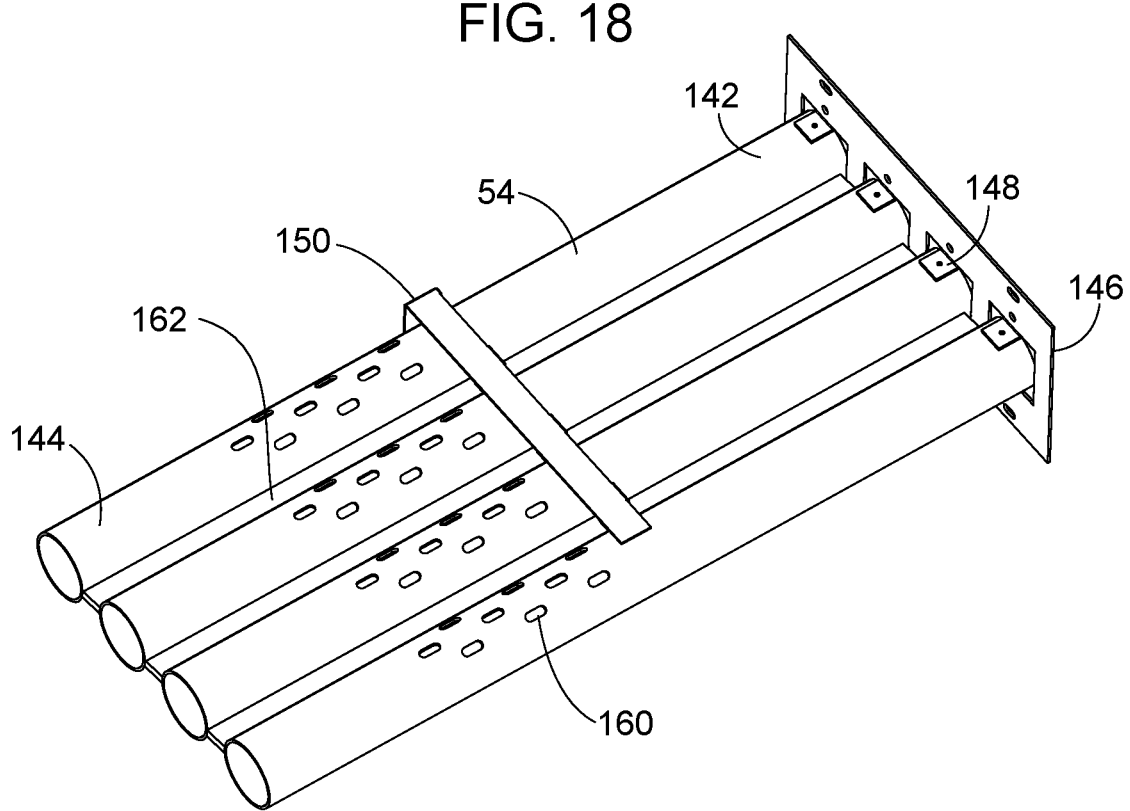
FIG. 19 is a top perspective view of the passive tube assembly from the heat distribution assembly of FIG. 7.

FIGS. 18 and 19 show an exemplary set of four passive tubes 54, with each passive tube 54 having a proximal end 142 and a distal end 144. The passive tubes 54 can be connected at the proximal end 142 in any suitable manner, such as by a mounting bracket 146 as shown. The illustrated mounting bracket 146 has a substantially rectangular configuration with an opening for receiving each passive tube 54, although other mounting bracket shapes and sizes can instead be used. A tab 148 can extend from the top and bottom of each opening to facilitate a joining connection between the passive tubes 54 and the mounting bracket 146, for example a welded connection. Other connections between the passive tubes 54 and the mounting bracket 146 (e.g., fasteners, welding, and the like) can also or instead be used. In some embodiments, a second bracket 150 can be positioned between the distal and proximal ends 142, 144 of the passive tubes 54 to help stabilize the passive tubes 54. In the illustrated embodiment, the second bracket 150 includes an upper bar connected to the tops of the passive tubes 54, a lower bar connected to the bottoms of the passive tubes 54, side bars extending between each pair of adjacent passive tubes 54, and at least one outer bar positioned outside of at least one of the end passive tubes 54. The mounting bracket 146 is configured to be removably connected to the side of the oven 10, for example using fasteners, as shown in FIG. 17. With the mounting bracket 146 disconnected, the entire passive tube assembly can be removed from the oven 10 as a single unit.

As discussed above, the passive tubes 54 are used as a baffle assembly to help regulate air pressure in the compartment 56, particularly in the location of the compartment 56 opposite the burner tubes 52. The space occupied by the passive tubes 54 creates a pressure profile in that portion of the compartment 56 that can promote a more even distribution of heated air to the fans 64A, 64B, 74A, 74B, and therefore a more controlled and repeatable temperature profile within the tunnel 24 of the oven 10.

With further reference to FIGS. 18 and 19, in some embodiments a plurality of openings 160 are provided in one or more of the passive tubes 54 to help facilitate the passage of heated air to one or more of the fans 64A, 64B, 74A, 74B (i.e., to fans 64B, 74B in the illustrated embodiment). The openings 160 in the illustrated embodiment have an obround configuration, and are located between the second bracket 150 and the distal end 144 of each passive tube 54. In other embodiments, however, the openings 160 can have any other shape or combination of shapes promoting the passage of air through the walls of the passive tubes 54, such as rectangular, round, or irregularly-shaped openings, slits, a grid of openings, and the like. Also, in other embodiments, the openings 160 can be located along other lengths of the passive tubes 54, such as openings 160 located in the passive tubes 54 from the distal ends 144 to the second bracket 150, or even openings 160 running the entire lengths of the passive tubes 54.

Again with reference to the illustrated embodiment, at least some of the openings 160 are aligned with, or positioned in an area of (e.g., adjacent), the passive tubes 54 proximate the second fan 64B and the fourth fan 74B, as shown, for example, in FIG. 18. Such positions of the openings 160 permit heated air from the burner tubes 52 to enter the open ends of the passive tubes 54, travel along a length of each passive tube 54, and then exit each passive tube 54 (through the openings 160) to the inlets of the second and fourth fans 64B, 74B. This flow can be significantly more desirable than trapping the heated air in the passive tubes 54 or requiring the heated airflow to only navigate around the exterior surfaces of the passive tubes 54.

In an exemplary embodiment, the openings 160 are provided in sets of three, and are offset from one another as shown in the illustrated embodiment. The openings 160 can be provided in just the tops and bottoms of each passive tube 54, or can instead be arrayed around the entire diameter of the passive tube 54. The numbers, sizes, shapes, configurations, spacing, and positioning of the openings 160 can be altered to modify the airflow and the heat distribution desired. Additionally, holes of different sizes can be located in different axial positions along one or more of the tubes 54. For example, additional holes can be provided further down the tubes 54 (i.e., toward the mounting bracket 146) that are larger in size so that air is encouraged to flow further into the passive tubes 54. In an exemplary embodiment, the size and shape of both the passive tubes 54 and the openings 160 can be configured to provide a more uniform or substantially even distribution of flow exiting the passive tubes 54 across the fans 64B, 74B.

In some cases, heated air flowing between and around the passive tubes 54 can create turbulence that negatively impacts even distribution of heated air in the passive tube side of the compartment 56. Also, in some cases heated air moving along the passive tubes 54 can be drawn into the fans 64B, 74B by being pulled between adjacent tubes 54. In any of these cases, a less uniform or even flow of heated air can enter the fans 64B, 74B, which can result in changes to the temperature of air at different locations in the oven tunnel 24. Such variances in heated airflow can also or instead result in fluctuations in the temperature of air as a function of time. To limit or prevent the ability of heated air to flow around the circumference of the passive tubes 54, one or more baffles can be positioned between one or more of the passive tubes 54. FIGS. 18 and 19 show an embodiment in which a set of baffle strips 162 is used to limit or block airflow. The illustrated embodiment includes three baffle strips 162, with one baffle strip 162 extending from and connecting the two interior tubes 54, and one baffle strip 162 connecting each of the outer tubes 54 with a respective adjacent inner tube 54. The illustrated baffle strips 162 are substantially rectangular members, each extending the entire length of each tube 54. Different connections can be used to secure each baffle strip 162 to one or more of the adjacent tubes 54, such as by welding, brazing, fastening, interconnections with features of the tubes 54 via interference fits, and the like. In some embodiments, one or more of the baffle strips 162 can be integrally formed with the passive tubes 54.

Also, the size, thickness, and length of the baffle strips 162 can be varied. For example, rather than extend along the entire length (or substantially the entire length) of the passive tubes 54, some or all of the baffle strips 162 can extend along only a portion of the passive tubes 54 (e.g., from a front portion to the distal ends 144 of the passive tubes 54, from a rear portion to the mounting bracket 146, only along those portions of the passive tubes 54 having openings 160, and the like). In some embodiments, the baffle strips 162 extend fully across the gap between adjacent passive tubes 54, thereby forming a web between the adjacent passive tubes 54 along any desired length of the passive tubes 54 as just described. In other embodiments however, the baffle strips 162 need not necessarily extend fully across the gap between adjacent passive tubes 54 while still performing the desired function of preventing or limiting airflow moving circumferentially around the passive tubes 54 as described herein.

In alternative embodiments, different sizes, shapes, numbers, and configurations of baffle strips 162 can be used. In some embodiments, fewer baffle strips 162 can be used, for example between only the two inner passive tubes 54 or between only the outer passive tubes 54 and the adjacent inner passive tubes 54. Baffle strips 162 can also extend from the outer passive tubes 54 outwardly from the passive tube assembly. Other embodiments can also use more than one baffle strip 162 extending between adjacent passive tubes 54. For example, multiple baffle strips 162 can be staggered along each passive tube 54, and can be in direct contact with one another or spaced from one another to define controlled openings between the baffle strips 162. Similarly, the baffle strips 162 can have any number of apertures therethrough of various sizes, shapes, and spacings to provide controlled airflow through the baffle strips 162.

Figure 20:
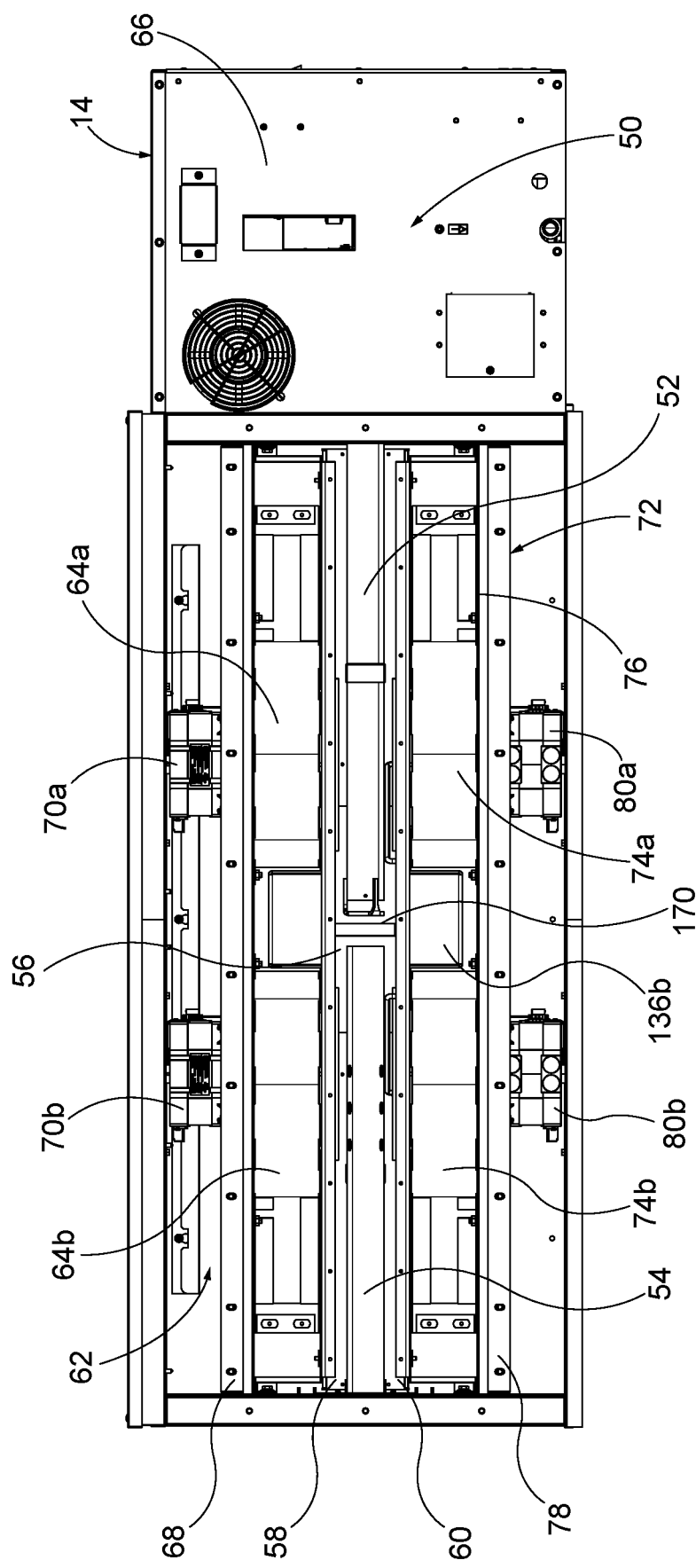
FIG. 20 is a rear view of an exemplary heat distribution assembly with a baffle plate.
Figure 21:
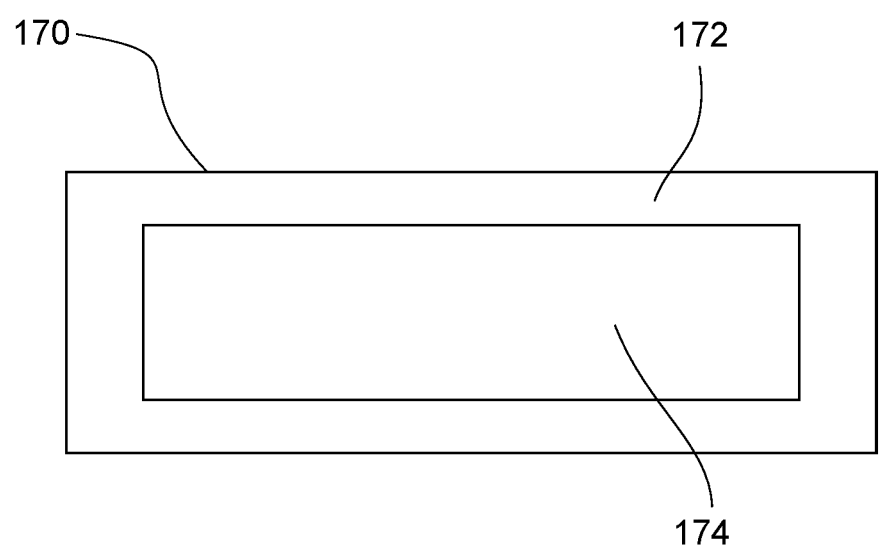
FIG. 21 is a side view of the baffle plate of FIG. 20.

In some cases, better heat distribution in the compartment 56 can be achieved by limiting airflow between the burner tubes 52 and the passive tubes 54. FIGS. 20 and 21 show an exemplary embodiment in which a baffle plate 170 is positioned in the compartment 56 between the burner tubes 52 and the passive tubes 54. The baffle plate 170 can be welded to the housing 13, or it can be removably connected therein, for example using fasteners, a sliding connection, one or more magnet sets, an interference fit, or other mechanical connection.

As best shown in FIG. 21, the baffle plate 170 in the illustrated embodiment has a substantially rectangular shape defining an outer frame 172 and a rectangular interior opening 174. Different configurations may be used to adjust the amount of airflow passing through the baffle plate 170 from areas proximate the burner tubes 52 to areas proximate the passive tubes 54. For example, the size of the opening 174 can be adjusted to be larger or smaller than what is shown. Additionally, the shape of the opening 174 can be modified to include any rectilinear or curvilinear shapes. Also, multiple openings 174 can be defined in the baffle plate 170, with the size, shape, and spacing of the openings 174 selected to create a desired airflow characteristic between through the baffle plate 170.

When installed in place between the burner tubes 52 and the passive tubes 54, any part or all of the periphery of the baffle plate 170 can abut adjacent structure of the compartment 56, such as a roof, floor, front wall, and rear wall at least partially defining the interior surfaces of the compartment 56 (e.g., any or all of which can be at locations between the burner tubes 52 and the passive tubes 54). In such embodiments, the interface between the peripheral surfaces and/or edges of the baffle plate 170 and the adjacent structure of the compartment 56 can be sealed against airflow passing around the baffle plate 170. In other embodiments, the peripheral surfaces and/or edges of the baffle plate 170 are otherwise positioned to prevent or reduce such airflow passing around the baffle plate 170. In the illustrated embodiment, the rectangular baffle plate 170 is located between the flame traps 136A, 136B, with peripheral (upper and lower) edges of the baffle plate 170 not abutting adjacent structure of the compartment 56. Accordingly, airflow from the burner tubes 52 can flow through the internal opening 174 of the baffle plate 170 as well as around the top and bottom edges of the baffle plate 170 and through the upper and lower flame traps 136A, 136B, respectively.

Although the illustrated apertured baffle plate 170 performs the function of restricting airflow from one side of the compartment 56 to the other by defining an airflow barrier between that part of the compartment 56 housing the burner tubes 52 and that part of the compartment 56 housing the passive tubes 545, it will be appreciated that other baffle plate shapes can be used to perform the same or similar functions. By way of example only, the baffle plate 170 need not necessarily have any internal opening 174, and can instead extend from less than all internal walls of the compartment 56 at the location between the burner tubes 52 and the passive tubes 54. For example, the baffle plate 170 can extend only from the roof of the compartment 56, only from the floor of the compartment 56, or only from the floor and rear wall of the compartment 56, and the like). In such cases, the baffle plate 170 still defines a restriction past which air from proximate the burner tubes 52 must pass. In other embodiments, any of the baffle plates 170 disclosed herein can have a number of apertures permitting a desired airflow to pass through the baffle plates 170, such as baffle plates 170 that are perforated, baffle plates 170 having a screen or grid-like structure, and the like. These alternative baffle plates 170 still define a restriction through which air from proximate the burner tubes 52 must pass to reach the passive tubes 54.

When servicing the oven 10, it can be necessary to remove one or more of the shelves 58, 60, 68, 78 to access different components, such as the fans 64A, 64B, 74A, 74B and the motors 70A, 70B, 80A, 80B. In FIG. 7, each of the shelves 58, 60, 68, 78 is a single unit or assembly that extends substantially across the length of the oven housing 12. In some embodiments, such shelves 58, 60, 68, 78 are removable from the oven 10 or are movable with respect to the oven housing 12 to enable greater access to any or all of the fans 64A, 64B, 74A, 74B and motors 70A, 70B, 80A, 80B. However, in some cases, the size and/or weight of the shelves 58, 60, 68, 78 make it difficult or impossible for an average user (e.g., service technician, assembler, and the like) to move or remove the shelves 58, 60, 68, 78 without human or mechanical assistance. Compounding this problem is the fact that the fans 64A, 64B, 74A, 74B and/or the motors 70A, 70B, 80A, 80B are often mounted to or otherwise carried by the shelves 58, 60, 68, 78, resulting in an assembly that can be even more bulky, heavy, and unwieldy. Accordingly, in some cases more than one individual is needed to service the fans 64A, 64B, 74A, 74B and/or motors 70A, 70B, 80A, 80B due to the weight and size of the shelves 58, 60, 68, 78 and the fans 64A, 64B, 74A, 74B and/or motors 70A, 70B, 80A, 80B connected thereto. This increases the assembly, maintenance, and service costs of the oven 10, and can increase the opportunity for injury resulting from movement of the shelves 58, 60, 68, 78.

Figure 22:
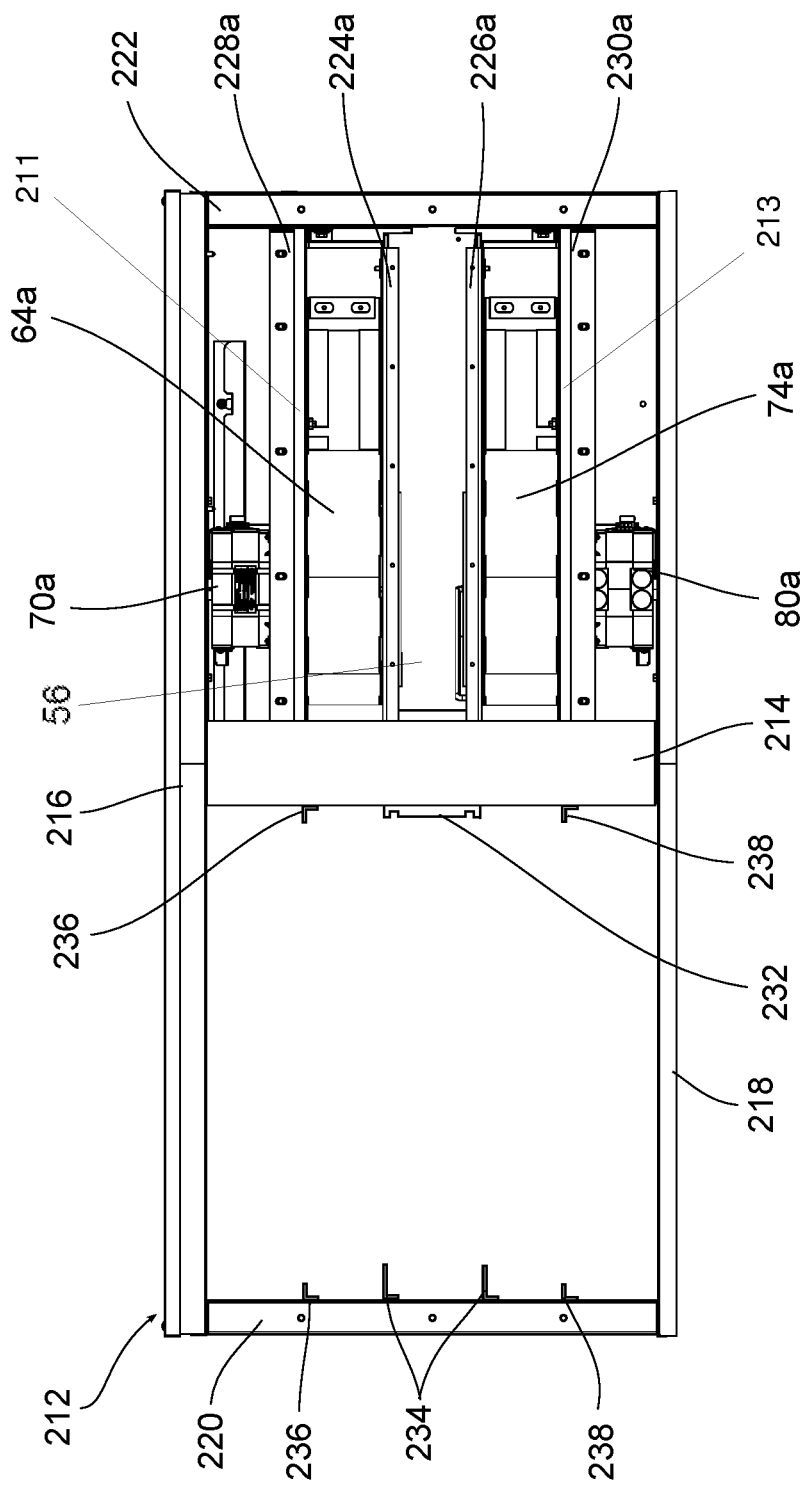
FIG. 22 is a rear view of an exemplary heat distribution assembly having individual shelf sections.

In contrast to the shelf design utilized in the embodiment shown in FIG. 7, FIG. 22 shows an example of a housing 212 in which smaller and lighter-weight shelves 224A, 226A, 228A, 230A, each spanning a fraction of the width of the housing 212, are used in place of shelves that span the entire width (or substantially the entire width) of the housing 212. In this regard, the illustrated shelves 224A, 226A, 228A, 230A are separated so that each shelf 224A, 226A, 228A, 230A extends from a respective end of the housing 212 to a central support 214. The illustrated shelves 224A, 226A, 228A, 230A are slidably supported in the housing 212 so as to be individually movable, and in some cases removable, by a user.

In the illustrated embodiment, a first upper shelf 224A extends from a second side 222 of the housing 212 to the central support 214 for supporting the first fan 64A, whereas a first lower shelf 226A extends from the second side 222 of the housing 212 to the central support 214 for supporting the second fan 74A. Also with reference to the illustrated embodiment of FIG. 22, a second upper shelf 228A extends from the second side 222 of the housing 212 to the central support 214 for supporting the first motor 70a, whereas a second lower shelf 230A extends from the second side 222 of the housing 212 to the central support 214 for supporting the third motor 80a. Similar shelves can be positioned on the opposite side of the housing 212 (extending between the first side 220 and the central support 214). Such shelves and interior components on the left side of the housing 212 in the illustrated embodiment of FIG. 22 have been removed from FIG. 22 to more clearly illustrate an example of elements used to support the removed shelves.

With continued reference to the illustrated embodiment of FIG. 22, the central support 214 extends between the housing top 216 and the housing bottom 218, and is positioned approximately mid-way between a first side 220 and a second side 222 of the housing 212. The central support 214 can be positioned at an outer edge of the housing 212, and extend into the housing 212 any desired amount.

In an exemplary embodiment, the shelves 224A, 226A, 228A, 230A are slidably supported by a series of brackets connected to the housing sides 220, 222 and the central member 214. With continued reference to the illustrated embodiment of FIG. 22, the brackets can have any shape suitable for supporting the shelves 224A, 226A, 228A, 230A. For example, a bracket 232 is connected to the central support 214, and is used in conjunction with a first pair of brackets 234 secured to the first side 220 of the housing 212 to support a third upper shelf and a third lower shelf (not shown). Also, a pair of additional brackets 236 secured to the first side 220 of the housing 212 and to the central member 214 at a higher elevation than the brackets 232, 234 are used to support a fourth upper shelf (not shown). Similarly, yet another pair of brackets 238 secured to the first side 220 of the housing 212 and to the central member 214 at a lower elevation than the bracket 232, 234 are used to support a fourth lower shelf (not shown). In the illustrated embodiment, the bracket 232 on the central member 214 is E-shaped, whereas the other brackets 234, 236, 238 are all L-shaped, each bracket 232, 234, 236, 238 having one or more surfaces upon which the shelves (not shown) rest at opposite ends of the shelves. It will be appreciated that any or all of the brackets 232, 234, 236, 238 can take any other shape suitable for supporting movable shelves within the housing 212, and in some cases for also enabling such shelves to slide to different horizontal positions with respect to the housing 212, and to even be removed from the housing 212. For example, any or all of the brackets 232, 234, 236, 238 can be elongated elements having a C-shaped cross section within which edges of a respective shelf is slidably received and supported. As another example, any or all of the brackets 232, 234, 236, 238 can be defined by pins, bosses, lugs, or other protrusions extending from and supported by the first side 220 of the housing 212 and the central member 214 at locations where they support opposite ends of the shelves. Still other bracket shapes, sizes, and forms suitable for supporting, slidably supporting, and removably supporting the shelves are possible, and fall within the spirit and scope of the present invention.

As indicated above, brackets that are the same or similar to the brackets 232, 234, 236, 238 described above are located on the right side of the oven illustrated in FIG. 22, and support the shelves 224A, 226A, 228A, 230A illustrated in the right side of the housing 212 in FIG. 22. The above-described features and description (and alternatives thereto) of the brackets 232, 234, 236, 238 in the left side of the housing 212 in FIG. 22 apply equally to those on the right side of the housing 212. Accordingly, the shelves 224A, 226A, 228A, 230A in the right side of the housing 212 are supported at their opposite ends by brackets secured to the central member 214 and the second side 222 of the housing 212.

In the illustrated embodiment of FIG. 22, brackets 232, 234, 236, are used to support opposite ends of a first shelf assembly 211 that includes first upper shelf 224A, first lower shelf 226a, first motor 70A, and first fan 64A, whereas brackets 232, 234, 238 are used to support opposite ends of second shelf assembly 213 that includes second upper shelf 226A, second lower shelf 230A, third motor 80A, and third fan 74A. Although not shown in FIG. 22, third and fourth (upper and lower) shelf assemblies 215, 217 are received in the left side or the compartment 56 as described above. The third and fourth shelf assemblies 215, 217 can be the same or substantially the same (e.g., identical or mirror images) as the first and second shelf assemblies 211, 213, and can respectively include upper and lower shelves, a fan 64a, 74b, and a motor 70b, 80b. In other embodiments, the third and fourth shelf assemblies 215, 217 are different in shape, size, and connected equipment than the first and second shelf assemblies 211, 213.

With continued reference to the illustrated embodiment of FIG. 22, the first shelf assembly 211 can be moved (e.g., slid) as a single unit upon the brackets 232, 234, 236 with respect to the oven housing 212 and the compartment 56 independently of the second, third, and/or fourth shelf assemblies 213, 215, 217. Similarly, the second shelf assembly 213 can be moved (e.g., slid) as a single unit upon the brackets 232, 234, 238 with respect to the oven housing 212 and the compartment 56 independently of the first, third, and/or fourth shelf assemblies 211, 215, 217. Also, the third shelf assembly 215 can be moved (e.g., slid) as a single unit upon the brackets 232, 234, 236 with respect to the oven housing 212 and the compartment 56 independently of the first, second, and/or fourth shelf assemblies 211, 213, 217. Additionally, the fourth shelf assembly 217 can be moved (e.g., slid) as a single unit upon the brackets 232, 234, 238 with respect to the oven housing 212 and the compartment 56 independently of the first, second, and/or third shelf assemblies 211, 213, 215. Such modularity and ease of movement of each shelf assembly (along with the fan and/or motor attached thereto) greatly increases the serviceability of the oven, and provides significant advantages to owners and operators of the oven. For example, the ability to move and remove one shelf carrying a single fan and motor assembly without moving or otherwise disturbing the other shelves (also carrying respective fan and motor assemblies) greatly simplifies work on the oven, and reduces the need for two or more individuals to service the oven. The modularity not only simplifies the process of assembling any of the motors or fans of the oven, but also significantly reduces the size and weight of the assembly that needs to be removed from the oven for servicing a single motor or fan.

Although the oven illustrated in FIG. 22 includes four shelf assemblies each having two shelves (e.g., first upper shelf 224A and second upper shelf 228A in the upper left assembly in FIG. 22), a fan (e.g., first fan 64A), and motor (first motor 70A), it should be noted that in other embodiments one or more of the shelf assemblies 211, 213, 215, 217 has a single shelf to which the fan and motor is mounted, such as to opposite sides of the same shelf. In such cases, a reduced number of brackets for supporting the assembly (at opposite ends of the single shelf) may be used. Also, each of the shelf assemblies 211, 213, 215, 217 illustrated in FIG. 22 includes both a fan and a motor, but in other embodiments one or more of the shelf assemblies 211, 213, 215, 217 need not necessarily include both the fan and the motor in order to provide the modularity, accessibility, and serviceability, benefits described herein. Alternative embodiments can include at least one shelf to which a motor and/or a fan are mounted, used in conjunction with at least one other shelf to which another motor and/or fan are mounted, wherein each assembly is movable (e.g., slidable) with respect to the oven housing, and in some cases removable from the oven housing 212.

The illustrated embodiment of FIG. 22, has four shelf assemblies 211, 213, 215, 217 as described above. However, in other embodiments, fewer shelf assemblies are included in the oven housing 212, such as two upper shelf assemblies and one lower shelf assembly, two lower shelf assemblies and one upper shelf assembly, three or more upper or lower shelf assemblies used in conjunction with at least one lower and/or upper shelf assemblies, respectively, and the like. Any of such embodiments can still utilize the shelf supporting system and elements described herein to achieve the oven modularity, accessibility, and serviceability, benefits described herein.

The foregoing detailed description of the certain exemplary embodiments has been provided for the purpose of explaining the principles of the application and examples of practical implementation, thereby enabling others skilled in the art to understand the disclosure for various embodiments and with various modifications as are suited to the particular use contemplated. This description is not necessarily intended to be exhaustive or to limit the application to the exemplary embodiments disclosed. Any of the embodiments and/or elements disclosed herein may be combined with one another to form various additional embodiments not specifically disclosed. Accordingly, additional embodiments are possible and are intended to be encompassed within this specification and the scope of the appended claims. The specification describes specific examples to accomplish a more general goal that may be accomplished in another way.

What is claimed is:

1. A conveyor oven for cooking food, the conveyor oven comprising:
  a housing having an oven chamber in which food is cooked;
  a conveyor moveable to convey the food within the oven chamber;
  a burner assembly operable to emit a flame to heat air for convection cooking of food moving within the oven chamber on the conveyor;
  a burner tube extending into a compartment and positioned to receive at least a portion of the flame emitted by the burner assembly;
  a passive tube in the compartment positioned opposite the burner tube;
  a baffle plate positioned between the passive tube and the burner tube, wherein the baffle plate includes an opening that defines a restriction through which air passes from the burner tube to the passive tube;
  a first shelf positioned in the housing, and movable relative to the compartment;
  a second shelf positioned in the housing, and movable relative to the compartment;
  a fan coupled to the first shelf and movable with the first shelf relative to the compartment; and
  a motor coupled to the second shelf and movable with the second shelf relative to the compartment, the motor configured to drive the fan,
  wherein the first shelf and the second shelf are each spaced apart from the burner tube along a height of the housing, and wherein the first shelf is independently moveable relative to the second shelf.

2. A conveyor oven for cooking food, the conveyor oven comprising:
a housing having an oven chamber in which food is cooked;
a conveyor moveable to convey the food within the oven chamber;
a burner assembly operable to emit a flame to heat air for convection cooking of food moving within the oven chamber on the conveyor;
a burner tube extending into a compartment and positioned to receive at least a portion of the flame emitted by the burner assembly;
a first shelf positioned in the housing, and movable relative to the compartment;
a second shelf positioned in the housing and spaced from the first shelf along a height of the housing, and movable relative to the compartment;
a fan coupled to the first shelf and movable with the first shelf relative to the compartment; and
a motor coupled to the second shelf and movable with the second shelf relative to the compartment, the motor configured to drive the fan,
wherein a first side of the first shelf and a first side of the second shelf are both movably supported by a common support positioned in the housing and a second side of the first shelf opposite the first side of the first shelf and a second side of the second shelf opposite the first side of the second shelf both extend to and are movably supported by a same side of the housing, and
wherein the fan and the motor are movable relative to the compartment as a single integral unit.

3. The conveyor oven of claim 2, wherein the common support is positioned in the compartment centrally along a longitudinal length of the compartment.

4. A conveyor oven for cooking food, the conveyor oven comprising:
a housing having an oven chamber in which food is cooked;
a conveyor moveable to convey the food within the oven chamber;
a burner assembly operable to emit a flame to heat air for convection cooking of food moving within the oven chamber on the conveyor;
a burner tube extending into a compartment and positioned to receive at least a portion of the flame emitted by the burner assembly;
a passive tube in the compartment positioned opposite the burner tube;
a first shelf positioned in the housing, and movable relative to the compartment, wherein one side of the first shelf is supported on an interior support positioned within the housing and an opposite side of the first shelf extends to and is supported by a first side of the housing;
a second shelf positioned in the housing, and movable relative to the compartment, wherein one side of the second shelf is supported on the interior support and an opposite side of the second shelf extends to and is supported by the first side of the housing;
a fan coupled to the first shelf and movable with the first shelf relative to the compartment; and
a motor coupled to the second shelf and movable with the second shelf relative to the compartment, the motor configured to drive the fan,
wherein the first shelf and the second shelf are each spaced apart from the burner tube along a height of the housing, and
wherein the first shelf is independently moveable relative to the second shelf.

5. The conveyor oven of claim 4, wherein the first shelf and the second shelf are each slidably supported by the housing.

6. The conveyor oven of claim 4, wherein the first shelf and the fan are movable relative to the compartment as a single integral unit.

7. The conveyor oven of claim 4, wherein the first shelf and the second shelf are positioned in the housing in a stacked arrangement at a height above or below the burner tube.

8. The conveyor oven of claim 4, wherein the first shelf is positioned below the burner tube along a height of the housing and the second shelf is positioned below the first shelf along the height of the housing.

9. The conveyor oven of claim 4, wherein the passive tube is a first passive tube having an outer wall, the conveyor oven further comprising:
a second passive tube having an outer wall and positioned opposite a second burner tube; and
a baffle strip extending between and connected to at least one of the first passive tube or the second passive tube,
wherein an end of at least one of the first passive tube or the second passive tube is open toward the burner tube.

10. The conveyor oven of claim 4, wherein the first passive tube has an outer wall that defines a plurality of apertures.

11. The conveyor oven of claim 4, wherein the first shelf is supported by the housing for movement to position the fan outside the compartment, or the second shelf is supported by the housing for movement to position the motor outside the compartment.

12. The conveyor oven of claim 4, further comprising a baffle plate positioned between the passive tube and the burner tube.

13. The conveyor oven of claim 12, wherein the baffle plate includes an opening that defines a restriction through which air passes from the burner tube to the passive tube.

14. The conveyor oven of claim 12, wherein at least part of a periphery of the baffle plate is sealed to an adjacent surface of the compartment.

15. The conveyor oven of claim 4, further comprising a rifling plate within the burner tube extending along a longitudinal axis of the burner tube.

16. The conveyor oven of claim 15, wherein the rifling plate is twisted about the longitudinal axis.

17. The conveyor oven of claim 15, wherein the rifling plate is connected to a distal end of the burner tube such that the rifling plate is permitted axial movement.

18. The conveyor oven of claim 15, wherein the rifling plate includes a projection extending in a radial direction from the rifling plate to the burner tube and the burner tube includes a slot configured to slidingly receive the projection.

19. The conveyor oven of claim 15, wherein the rifling plate is centered in the burner tube.

20. The conveyor oven of claim 15, further comprising a target positioned at a distal end of the burner tube.

21. The conveyor oven of claim 4, wherein the interior support is positioned in the compartment centrally along a longitudinal length of the compartment.

* * * * *